(12) United States Patent
Redshaw et al.

(10) Patent No.: US 8,723,860 B2
(45) Date of Patent: May 13, 2014

(54) METHODS AND SYSTEMS FOR GENERATING 3-DIMENSIONAL COMPUTER IMAGES

(75) Inventors: Jonathan Redshaw, Hertfordshire (GB); Xile Yang, Rickmansworth (GB)

(73) Assignee: Imagination Technologies, Ltd., Kings Langley, Hertfordshire (GB)

( * ) Notice: Subject to any disclaimer, the term of this patent is extended or adjusted under 35 U.S.C. 154(b) by 1368 days.

(21) Appl. No.: 11/986,491

(22) Filed: Nov. 21, 2007

(65) Prior Publication Data

US 2009/0066694 A1 Mar. 12, 2009

(30) Foreign Application Priority Data

Sep. 12, 2007 (GB) .................................. 0717781.9

(51) Int. Cl.
*G06T 19/00* (2011.01)
*G06T 17/20* (2006.01)
*G06T 1/60* (2006.01)

(52) U.S. Cl.
USPC ........................... 345/419; 345/423; 345/543

(58) Field of Classification Search
USPC ................................... 345/506, 543, 547, 553
See application file for complete search history.

(56) References Cited

U.S. PATENT DOCUMENTS

| | | | | |
|---|---|---|---|---|
| 5,561,750 A * | 10/1996 | Lentz | ............................ | 345/422 |
| 6,631,419 B1 * | 10/2003 | Greene | ......................... | 709/238 |
| 6,731,814 B2 * | 5/2004 | Zeck et al. | .................... | 382/239 |
| 7,102,646 B1 * | 9/2006 | Rubinstein et al. | ........... | 345/570 |
| 2003/0025695 A1 * | 2/2003 | Morphet | ....................... | 345/423 |
| 2004/0155878 A1 | 8/2004 | Inazumi | | |
| 2004/0233207 A1 * | 11/2004 | Morphet | ....................... | 345/553 |
| 2007/0132772 A1 | 6/2007 | Morphet | | |
| 2008/0010308 A1 * | 1/2008 | Erdogan et al. | ............... | 707/101 |
| 2008/0186318 A1 | 8/2008 | Redshaw et al. | | |

FOREIGN PATENT DOCUMENTS

| | | |
|---|---|---|
| EP | 1351195 A2 | 10/2003 |
| GB | 2281682 A | 3/1995 |
| GB | 2298111 A | 8/1996 |
| GB | 2343603 A | 5/2000 |

(Continued)

OTHER PUBLICATIONS

Hsien-Cheng E. Hsieh, U.S. Appl. No. 09/540,616 (WO 01/75804).*

(Continued)

*Primary Examiner* — Kee M Tung
*Assistant Examiner* — Sing-Wai Wu
(74) *Attorney, Agent, or Firm* — Michael S. Garrabrants

(57) ABSTRACT

There are provided methods and apparatus for generating a 3-dimensional computer image. The image includes a number of objects and is divided into separate areas. Control data to link to object data stored in a memory for each object is derived for two objects at a time. Two or more separate areas can be processed in parallel by deriving control data for the two separate areas at a time. To avoid fetching data for both areas, which is actually only applicable to one area, encoding is used in the control data. The object data can be stored on one or across two memory pages, and the control data includes one memory page address in the former case and two memory page addresses in the latter case. The object data can also be stored across two non-contiguous memory pages, by using a look-up table with contiguous portions allocated for each object's object data. When partial rendering is used, and partial depth data is stored and subsequently updated, the depth data can be stored across two memory pages using link portions in the memory pages to either indicate the end of data storage or point to the next memory page.

21 Claims, 13 Drawing Sheets

(56) References Cited

FOREIGN PATENT DOCUMENTS

| GB | 2 442 266 A | 4/2008 |
|---|---|---|
| WO | WO 00/28483 | 5/2000 |
| WO | WO 01/95257 A1 | 12/2001 |
| WO | WO 2004/086309 A2 | 10/2004 |

OTHER PUBLICATIONS

UK Search Report dated Dec. 8, 2009 (1 page).
UK Examination Report dated Dec. 10, 2009 (1 page).
U.S. Appl. No. 11/707,209, Improvements in Memory Management for Systems for Generating 3-Dimensional Computer Images, Feb. 15, 2007.

* cited by examiner

Primitive Mask Word if PF_MASK_CONTROL = 01 and PF_PRM_START are 00

Primitive Mask Word if PF_MASK_CONTROL = 01 and PF_PRM_START are 01

Primitive Mask Word if PF_MASK_CONTROL = 01 and PF_PRM_START are 10

Primitive Mask Word if PF_MASK_CONTROL = 01 and PF_PRM_START are 11

METHODS AND SYSTEMS FOR GENERATING 3-DIMENSIONAL COMPUTER IMAGES

FIELD OF THE INVENTION

This invention relates to methods and apparatus for generating 3-dimensional computer images.

BACKGROUND OF THE INVENTION

In the applicant's UK Patent No. 2281682, there is described a 3-D rendering system for polygons in which each primitive object in the 3D scene is seen to be viewed as defined in a set of surfaces which are infinite. Each elementary area of the screen (e.g. pixel) in which an image is to be displayed has a ray projected through it from a viewpoint into the 3-D scene. The location of the intersection of the projected ray with each surface is then determined. From these intersections, it is then possible to determine whether any intersected surface is visible at that elementary area. The elementary area is then shaded for display in dependence on the results of the determination.

The system can be implemented in a pipeline type processor comprising a number of cells, each of which can perform an intersection calculation with a surface. Thus, a large number of surface intersections can be computed simultaneously. Each cell is loaded with a set of coefficients defining the surface for which it is to perform the intersection test.

An improvement to this arrangement is described in the applicant's UK Patent No. 2298111. In that document, the image is divided into sub-regions or tiles and the tiles can be processed in turn. It is proposed to use a variable tile size and to project a bounding box around complete primitive objects so that only those tiles falling within the bounding box require processing. This is done by determining the distribution of primitive objects on the visible screen, in order for a suitable tile size to be selected. Each object in the tile is stored as a number of triangles having surfaces and vertices. Other shapes are also possible. The surfaces which define the various primitive objects are then stored in a list, known as the display list, thereby avoiding the need to store identical surfaces for each tile, since one object made of many surfaces could appear in a number of tiles. Object pointers which identify the primitive objects in the display list are also stored. There is one object pointer list per tile. The tiles can then be rendered in turn using the ray casting technique described above until all primitive objects within each tile are processed. This is a useful method because no effort needs to be made to render objects which are known not to be visible in a particular tile.

A further improvement on this system is proposed in the applicant's International Patent Application Nos. PCT/GB99/03707 (publication number WO 2000/028483) and PCT/GB2004/001076 (publication number WO 2004/086309) and the applicant's UK Patent No. 2343603, in which any tiles within the bounding box which are not required to display a particular primitive object are discarded before rendering.

FIG. 1 shows the type of processor 101 used in the existing systems described above. Essentially, there are three components. The tile accelerator unit (TA) 103 performs the tiling operation i.e. selects a suitable tile size and divides the visible screen into tiles, and supplies the tile information i.e. the 3-D object data for each tile, to the display list memory 105. The image synthesis processor (ISP) 107 uses the 3-D object data in the display list memory to perform the ray/surface intersection tests discussed above. This produces depth data for each elementary area of the visible screen. After this, the derived image data from the ISP 107 is supplied to texturing and shading processor (TSP) 109 which applies texturing and shading data to surfaces which have been determined as visible and outputs image and shading data to a frame buffer memory 111. Thus, the appearance of each elementary area of the display is determined so as to represent the 3-D image.

In the systems described above, a problem may arise as the complexity of the scene to be rendered increases. Complex scenes require more 3-D object data for each tile to be stored in the display list memory and this means that storage requirements increase. If the display list memory runs out of space, parts of the scene may simply not be rendered and this type of image corruption is becoming less and less acceptable.

In order to solve this problem, the applicant's International Patent Application No. PCT/GB01/02536 (publication number WO 2001/095257) proposes the idea of partial rendering. The state of the system (ISP and TSP) is stored to memory before rendering of a tile is complete, and the state is reloaded at a later time in order to finish the rendering. This process is referred to as "z/frame buffer load and store".

The screen is divided up into a number of regions called macro-tiles, each macro-tile consisting of a rectangular region of the screen. Memory in the display list is then divided into blocks and these are listed in a free store list. Blocks from the free store are then allocated to the macro-tiles as required. The tiling operation stores data associated with each macro-tile in each block. (The tiling operation performed by the TA fills the display list memory so is sometimes referred to as Memory Allocation.) When the display list memory fills up, or reaches some predefined threshold, the system selects a macro-tile, performs a z/frame buffer load, and renders the contents of the macro-tile before saving it using a z/frame buffer store operation. Thus, depth data for the macro-tile is stored according to the data loaded into the display list so far. Upon completion of such a render, the system frees any memory blocks associated with that macro-tile, thereby making them available for further storage. (Because the rendering process frees up display list memory space, it is known as Memory De-Allocation.) So, the scene for each tile is constructed by a number of tiling operations followed by partial renders. Each partial render updates the depth data stored. This means that an upper bound on the memory consumption is imposed and also the memory bandwidth consumed by the system is minimised.

One example of a type of processor used in the partial rendering system is shown in FIG. 2. It can be seen that this is a modified version of FIG. 1. A z buffer memory 209 is linked to the ISP 207 via a z compression/decompression unit 211. This comes into operation when the system is rendering a complex scene and the display list memory 205 is not large enough to contain all the surfaces which need to be processed for a particular tile. The display list will be loaded with data by the TA 203 for all the tiles until it is substantially full (or until a predefined threshold is reached). This may, however, only represent a portion of the initial data. The image is rendered one tile at a time by ISP 207. The output data for each tile is provided to TSP 213, which uses texture data to texture the tile. At the same time, because the image data was incomplete, the result (i.e. depth data) from ISP 207 is stored to buffer memory 209 via compression/decompression unit 211 for temporary storage. The rendering of the remaining tiles then continues with the incomplete image data until all the tiles have been rendered and stored in frame buffer memory 215 and in z buffer memory 209.

The first part of the display list is then discarded and the additional image data read into it. As processing is performed for each tile in turn by ISP 207, the relevant portion of data from z buffer memory 209 is loaded via the z compression/decompression unit 211 so that it can be combined with the new image data from display list memory 205. The new depth data for each tile is then fed to TSP 213 which combines it with texture data before supplying it to the frame buffer 215.

This process continues for all the tiles in the scene and until all the image data has been rendered. Thus, it can be seen that the z buffer memory fills a temporary store which enables a smaller display list memory to be used than would be necessary for rendering particularly complex scenes. The compression/decompression unit 211 is optional but it enables a smaller z buffer memory to be used. In addition, deferred pixel processing is enabled, which eliminates any redundant pixel operations.

So, as discussed in International Patent Application No. PCT/GB01/02536, once the display list memory fills up, or reaches a certain threshold, the system selects a macro-tile to render in order to free up some display list memory. In that application, the selection of the macro-tile to render depends on a number of factors, for example the macro-tile which will release the most memory back to the free-store may be chosen.

A further improvement to this system has been provided in the applicant's UK application no. 0619327.0. A schematic example of a processor used in that arrangement is shown in FIG. 3. It can be seen that the system 301 is similar to that of FIG. 2 and includes a TA 303, ISP 311, TSP 313 and Frame Buffer 315. In this case, however, the Display List Memory 305 and the Z Buffer Memory 307 are both part of a single heap of memory, termed the Parameter Memory 309. Allocation between the Display List and the Z Buffer within the parameter memory is according to need, which makes for more efficient memory usage. FIG. 3 does not show a z compression/decompression unit, as in FIG. 2, but such a unit could be included.

In addition, in the applicant's UK application no. 0619327.0, the display list memory comprises a block for each macro-tile that requires it and also a global list. It is possible for object data to traverse more than one macro-tile. In this case, the object data is allocated to the global list, which contains only object data that is in more than one macro-tile. The display list is thus grouped into macro-tiles plus a global list. All object and control stream data within a macro-tile will only be addressed by tiles that reside within a given macro-tile and any object data residing in more than one macro-tile is in the global list and this data can be addressed from any control stream. This also makes for more efficient memory usage and access.

FIG. 4 shows a particular example of a system described in UK 0619327.0. The arrangement includes a Dynamic Parameter Manager DPM 411, the ISP 407, the Macro Tiling Engine 403, the Tiling Engine TE 405 and the memory 409. In general terms, the MTE 403 generates the primitive object data for each macro-tile and enters that in the appropriate part of the memory 409. The TE 405 uses the primitive object data from MTE 403 to generate control stream data for each tile and enters that in the memory 409. Thus, the MTE and TE together act as the Tile Accelerator so that the memory area for each tile in each macro tile points to the appropriate object data memory areas. The ISP 407 uses the object data to derive depth data and stores that in the z-buffer part of memory 409.

A more detailed description of the FIG. 4 operation will now be given with reference also to FIG. 5. FIG. 5 shows several triangle shapes to be displayed. Each triangle shape is known as a primitive, or simply a shape. The screen is divided into 30 tiles. The primitives are divided into two primitive objects. The first primitive object has vertices 501, 503, 505, 507 and 509. The second primitive object has vertices 511, 513, 515, 517 and 519. Thus, each primitive object comprises a number of primitives.

At the first step, the vertex and primitive data are input (at 401). The triangles in FIG. 5 are grouped into the two primitive objects with vertices 501 to 509 and 511 to 519. Each of the primitive objects is written into memory by MTE 403 using the DPM 411 to appropriately allocate memory space, and the memory addresses are passed to the next step of tiling.

At the second step, the MTE processes the vertices 501 to 509 and 511 to 519 into screen space, removing any vertices which are invisible as off-screen (none in this case). As already discussed, to minimise the impact of memory bandwidth to fetch the primitive and vertex data, primitives are grouped into primitive objects in macro-tiles. Each macro-tile is typically a quarter or a sixteenth of the screen size. When primitive objects cross macro-tiles, their data may be written only once to the global list. Thus, at 403, the primitive objects (having a maximum number of vertices) are written into the part of memory 409 associated with that macro-tile. The memory pages associated with each macro-tile are allocated by the DPM 411 on demand. The number of vertices and primitives, together with the memory addresses of the primitive objects (these are known as vertex pointers) are sent to the TE 405 to be added into the control stream of the tiles in which the primitive objects are visible.

At the third step, the TE 405 writes control data to each tile. Each primitive from a primitive object written at MTE 403 is checked against each tile inside the bounding box of the primitive object. Control data are written into the control stream associated with the tile if there are any primitives visible in the tile. So, for the first primitive in FIG. 5, having vertices 501 to 509, the control data associated with the primitive object are only written into some of the tiles, like C2, C3, C4 and C5 (shaded grey), not into tiles such as C1 and C6. Similarly, for the second primitive object in FIG. 5, having vertices 511 to 519, the control data are only written for some of the tiles, like B4 and B5, but not for others, like B6. The control data written at this step include a primitive object header for the number of vertices and primitives in the primitive object, and a vertex pointer for the memory address of the primitive object written to. Separate memory spaces are allocated to each tile for the control stream by the DPM 411.

Finally, at the fourth step, 3D image processing is performed by ISP 407. The 3D processing is performed for each tile in the screen. Referring to FIG. 6, which shows an overview of the data structure for tiling, the 3D processing is performed for each tile from the region array 601. The control data for each tile, comprises a number of control streams 0 to M in FIG. 6. Each control stream comprises a primitive object header and a vertex pointer and the number of control streams in the control data for that tile depends on the number of primitive objects falling within that tile. The ISP traverses through the control stream of each tile 603, reads the vertex and primitive data from memory address by the vertex pointer in the control data 605. So, referring to FIG. 5 again, some of the tiles contain no primitives, some tiles, like B2, contain primitives from only one primitive object, and other tiles, like C2 and C3, contain primitives from both primitive objects. Image processing operations like hidden surface removing, texturing and shading are performed on all the primitives from the primitive object valid in the tile.

Although the known arrangement described above does have many advantages, it does have some drawbacks. The tiling system processes a primitive object in each tile so the memory writes for control data jumps from one control stream to another. This breaks the memory burst size and reduces the efficiency of memory access.

Also, when a big primitive shape covers many of the tiles on the screen, the control data are repeated many times over. The vertex and primitive data in a particular memory block may be read many times in many tiles, during the 3-D image processing. This increases memory bandwidth. On the other hand, if only some of the vertices and primitives from a primitive object are visible in a given tile, it is not efficient to fetch the whole primitive object data.

The memory pages used in macro tiles for vertex and primitive data are allocated on demand, and are therefore not necessarily contiguous pages. To prevent the data from a particular primitive object crossing a page boundary, a new page, from the free store, has to be allocated if there is insufficient space on the current page for the whole primitive object. This creates wastage. Also, in a pipelined system, the exact size of a primitive object is not known until the entire object is actually written, so a maximum size has to be assumed at the start. This creates further wastage.

For the partial rendering, discussed initially with reference to FIG. 2, there is a similar problem in that the compression/decompression unit 211 does not know the size of the compressed z data for the tile when it starts to compress the z data and write it into memory 209. To avoid the compressed data for a tile crossing a memory page, at the start of a tile, the compression/decompression unit 211 has to check if there is enough space in the current memory page. This check has to assume a maximum size for the compressed z data, which creates wastage.

The inventors of the present invention have seen that various improvements could be made to the known systems described above.

SUMMARY OF THE INVENTION

According to a first aspect of the invention, there is provided a method for generating a 3-dimensional computer image, the image to be generated comprising a plurality of objects, each object comprising at least one shape, the method comprising the steps of: a) subdividing the image into a plurality of rectangular areas and each rectangular area into a plurality of smaller areas; b) for at least some of the objects in the image, storing object data in a memory, the object data comprising surface data and vertex data for each shape in the object, and pointers between the surface data and the vertex data; c) for each smaller area in the image, deriving control data to link to the object data for each object in the smaller area by: i) extracting object data for two or more objects from the object data stored at step b); ii) computing which of the smaller areas in the image include one or all of the objects for which object data has been extracted at step i); iii) for each of the smaller areas computed at step ii), deriving a set of control data, the set of control data linking to object data for the or each of the objects included in the smaller area; iv) repeating steps i) to iii) until control data for all objects at b) has been derived; d) deriving depth data for each rectangular area from the control data and the object data; and e) deriving image data and shading data from the depth data, for display.

Because the control data is derived two or more objects at a time, memory access is improved. Each set of control data derived at step iii) comprises links to the object data of all the objects for which object data has been extracted at step i), which are included in that smaller area.

Preferably, at the final memory location for each set of control data derived at step iii), a pointer is provided to the next set of control data for the smaller area and the final memory location is stored in a cache. Thus, because the control data will include links to the object data of all the objects for which object data has been extracted at step i), which are included in that smaller area, the cache only has to be accessed once even though there is more than one object falling within that smaller area.

In one embodiment, step b) comprises storing object data in a memory for every object in the image. This is when there is sufficient memory space for all the object data to be stored.

In an alternative embodiment, step b) comprises storing object data in a memory for a predetermined number of objects in the image and the method further comprises, before step e), repeating steps b), c) and d) until object data has been stored for all the objects in the image. The predetermined number may be determined by the available memory size.

In one preferred embodiment, step i) comprises extracting object data for two objects from the object data stored at step b).

According to the first aspect of the invention, there is also provided apparatus for generating a 3-dimensional computer image, the image to be generated comprising a plurality of objects, each object comprising at least one shape, the apparatus comprising: a) means for subdividing the image into a plurality of rectangular areas and each rectangular area into a plurality of smaller areas; b) means for storing object data in a memory, for at least some of the objects in the image, the object data comprising surface data and vertex data for each shape in the object, and pointers between the surface data and the vertex data; c) deriving means for deriving control data, for each smaller area in the image, the control data linking to the object data for each object in the smaller area, the deriving means being arranged to: i) extract object data for two or more objects from the object data stored by the means for storing, ii) compute which of the smaller areas in the image include one or all of the objects for which object data has been extracted, iii) for each of the smaller areas computed at ii), derive a set of control data, the set of control data linking to object data for the or each of the objects included in the smaller area, and iv) repeat i) to iii) until control data for all objects at b) has been derived; d) means for deriving depth data for each rectangular area from the control data and the object data; and e) means for deriving image data and shading data from the depth data, for display.

According to a second aspect of the invention, there is provided a method for generating a 3-dimensional computer image, the image to be generated comprising a plurality of objects, the method comprising the steps of: a) subdividing the image into a plurality of separate areas; b) for at least some of the objects in the image, storing object data in a memory; c) for two separate areas at a time, deriving control data to link to the object data in the two separate areas; d) generating the 3-dimensional computer image in the two separate areas by, in parallel: i) deriving depth data for the first separate area from the control data and the object data, and deriving image data and shading data for the first separate area from the depth data for display; and ii) deriving depth data for the second separate area from the control data and the object data, and deriving image data and shading data for the second separate area from the depth data for display; and e) repeating steps c) and d) until an image has been generated for all the separate areas.

Because two separate areas are processed in parallel at d), the processing is achieved more quickly.

Each separate area is preferably rectangular. The two separate areas are preferably adjacent rectangular separate areas, one on the left and one on the right.

In one preferred embodiment, each object includes a plurality of shapes having a plurality of vertices, and the control data derived at step c) includes, for each object, an indication of which shapes of the object fall in which of the separate areas and an indication of which vertices of the object fall in which of the separate areas.

This indication of where the shapes and vertices fall means that when the depth data is being derived, there are no unnecessary data fetches to obtain data for shapes or vertices that do not actually fall within the separate area being processed.

In one embodiment, the control data comprises a header portion and a payload portion.

Preferably, the header portion comprises the indication of which vertices of the object fall in which of the separate areas.

Preferably, if some of the shapes of the object fall in each of the separate areas, or all of the shapes of the object fall in only one of the separate areas, the payload comprises the indication of which shapes of the object fall in which of the separate areas.

According to the second aspect of the invention, there is also provided apparatus for generating a 3-dimensional computer image, the image to be generated comprising a plurality of objects, the apparatus comprising: a) means for subdividing the image into a plurality of separate areas; b) means for storing object data in a memory, for at least some of the objects in the image; c) deriving means for deriving, for two separate areas at a time, control data to link to the object data in the two separate areas; and d) an image generator for generating a 3-dimensional computer image in the two separate areas, the image generator comprising a first image generator in parallel with a second image generator, the first image generator being arranged to derive depth data for the first separate area from the control data and the object data, and derive image data and shading data for the first separate area from the depth data for display, the second image generator being arranged to derive depth data for the second separate area from the control data and the object data, and derive image data and shading data for the second separate area from the depth data for display.

According to a third aspect of the invention, there is provided a method for generating a 3-dimensional computer image, the image to be generated comprising a plurality of objects, the method comprising the steps of: a) subdividing the image into a plurality of separate areas; b) for at least some of the objects in the image, a first engine storing object data in a memory, the memory being divided into memory pages; c) for each object for which object data has been stored at b), if the object data is stored on one memory page, the first engine sending that memory page address to a second engine or, if the object data is stored on two memory pages, the first engine sending those memory page addresses to the second engine; d) for each separate area in the image, the second engine deriving control data to link to the object data for each object in the smaller area, the control data including the one memory page address if the object data stored at b) is stored on one memory page, and including the two memory page addresses if the object data stored at b) is stored on two memory pages; e) deriving depth data for each separate area from the control data and the object data; and f) deriving image data and shading data from the depth data, for display.

The object being stored on two memory pages means that the data extends across two pages (rather than that the data is duplicated). Because the object data stored at b) can be stored on a single memory page or across two memory pages, memory wastage is reduced. The correct memory pages can be found when the image is being processed, in this case, since two memory page addresses are included in the control data.

The method may further comprise the step of: a memory manager allocating pages of the memory to the objects in the image.

In that case, the memory manager may automatically allocate two pages of memory to each object. If, in fact, the object data requires only one memory page, the second memory page is simply used for the next set of object data.

Preferably, step e) of deriving depth data comprises determining whether the control data linking to object data for each object in the separate area includes one or two memory page addresses.

According to the third aspect of the invention, there is also provided apparatus for generating a 3-dimensional computer image, the image to be generated comprising a plurality of objects, the apparatus comprising: a) means for subdividing the image into a plurality of separate areas; b) a first engine for storing object data in a memory for at least some of the objects in the image; c) a second engine for deriving control data to link to the object data for each object in the smaller area; d) means for deriving depth data for each separate area from the control data and the object data; and f) means for deriving image data and shading data from the depth data, for display, wherein the memory is divided into memory pages, the first engine is arranged, for each object for which object data has been stored, i) if the object data is stored on one memory page, to send that memory page address to the second engine or, ii) if the object data is stored on two memory pages, to send those memory page addresses to the second engine, and the control data includes the one memory page address if the object data stored by the first engine is stored on one memory page, or includes the two memory page addresses if the object data stored by the first engine is stored on two memory pages.

The apparatus further comprising a memory manager for allocating pages of the memory to the objects in the image. The memory manager may be arranged to automatically allocate two pages of memory to each object.

Preferably, the means for deriving depth data is arranged to determine whether the control data linking to object data for each object in the separate area includes one or two memory page addresses.

According to the third aspect of the invention, there is also provided a method for generating a 3-dimensional computer image, the image to be generated comprising a plurality of objects, the method comprising the steps of: a) subdividing the image into a plurality of separate areas; b) providing a memory divided into memory pages and comprising a look-up table; c) a memory manager allocating two or more contiguous portions in the look-up table to each separate area, each allocated portion in the look-up table pointing to a memory page available for storing object data for that separate area; d) for at least some of the objects in the image, a first engine storing object data, for each separate area, in the memory pages allocated at step c) to that separate area; e) for each separate area, the first engine sending to a second engine, memory addresses of the two or more allocated portions in the look-up table; f) for each separate area in the image, the second engine using the memory addresses sent from the first engine, to derive control data to link to the object data for each object in the smaller area; g) for each separate area in the image, using the memory addresses sent from the first engine to derive depth data from the control data and the object data; and h) deriving image data and shading data from the depth data, for display.

By using a look up table, which has contiguous portions allocated to each separate area, the actual memory pages where object data for that separate area is stored, do not need to be contiguous. This means that, object data, can span two memory pages, even though the memory pages are not necessarily contiguous. This improves memory usage and reduces wastage. The term "contiguous" here is used to mean next in order or successive i.e. the two or more contiguous portions in the look-up table are neighbouring portions in the look-up table, one following the other.

According to the third aspect of the invention, there is also provided apparatus for generating a 3-dimensional computer image, the image to be generated comprising a plurality of objects, the apparatus comprising: a) means for subdividing the image into a plurality of separate areas; b) a memory divided into memory pages and comprising a look-up table; c) a memory manager for allocating two or more contiguous portions in the look-up table to each separate area, each allocated portion in the look-up table pointing to a memory page available for storing object data for that separate area; d) a first engine arranged to store object data, for at least some of the objects in the image, for each separate area, in the memory pages allocated by the memory manager to that separate area; e) a second engine arranged to receive from the first engine, memory addresses for each separate area, of the two or more allocated portions in the look-up table and arranged to use the memory addresses to derive control data to link to the object data for each object in the separate area; g) means for using the memory addresses to derive depth data from the control data and the object data for each separate area in the image; and h) means for deriving image data and shading data from the depth data, for display.

According to a fourth aspect of the invention, there is provided a method for generating a 3-dimensional computer image, the image to be generated comprising a plurality of objects, the method comprising the steps of: a) subdividing the image into a plurality of separate areas; b) for at least some of the objects in the image, storing object data in a first memory; c) deriving depth data for each separate area, from the object data; d) providing a second memory for storing the depth data, the second memory comprising a plurality of memory pages, each memory page including a portion allocated as a link portion; e) storing the depth data for each separate area in the second memory, wherein, if the depth data for a separate area is stored on one memory page, indicating as such in the link portion of that memory page, or, if the depth data for a separate area is stored on more than one memory page, using the link portion of each memory page for that separate area to point to the next memory page for that separate area; f) loading further object data into the first memory to replace at least part of the existing contents; g) retrieving the stored depth data for each separate area, by reading the link portion of the or each memory page for that separate area; h) deriving updated depth data from the new object data and the stored depth data, and storing the updated depth data to replace the previously stored depth data; i) repeating steps e), f), g) and h) until there is no further object data to load into the memory; and j) deriving image data and shading data from the depth data, for display.

According to the fourth aspect of the invention, there is also provided apparatus for generating a 3-dimensional computer image, the image to be generated comprising a plurality of objects, the apparatus comprising: a) means for subdividing the image into a plurality of separate areas; b) a first memory for storing object data for at least some of the objects in the image; c) means for deriving depth data for each separate area, from the object data; d) a second memory for storing the depth data, the second memory comprising a plurality of memory pages, each memory page including a portion allocated as a link portion; e) means for storing the depth data for each separate area in the second memory, wherein, if the depth data for a separate area is stored on one memory page, indicating as such in the link portion of that memory page or, if the depth data for a separate area is stored on more than one memory page, using the link portion of each memory page for that separate area to point to the next memory page for that separate area; f) means for loading further object data into the first memory to replace at least part of the existing contents; g) means for retrieving the stored depth data for each separate area, by reading the link portion of the or each memory page for that separate area; h) means for deriving updated depth data from the new object data and the stored depth data, and storing the updated depth data to replace the previously stored depth data; and i) means for deriving image data and shading data from the depth data, for display.

Aspects described in relation to one aspect of the invention may also be applicable to another aspect of the invention.

BRIEF DESCRIPTION OF THE DRAWINGS

Existing systems have already been described with reference to FIGS. 1 to 6, of which.

Figure 7:
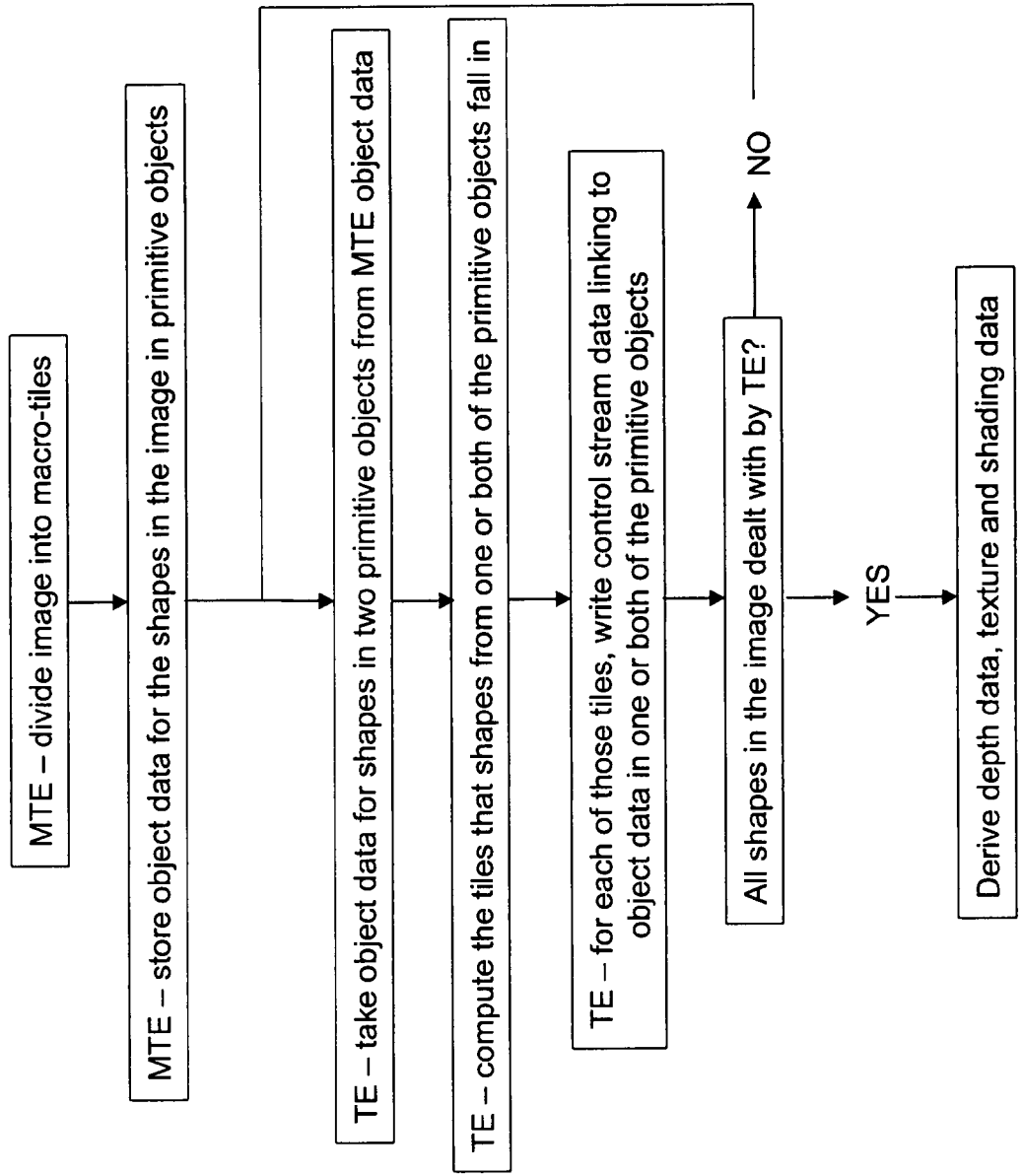
Figure 8:
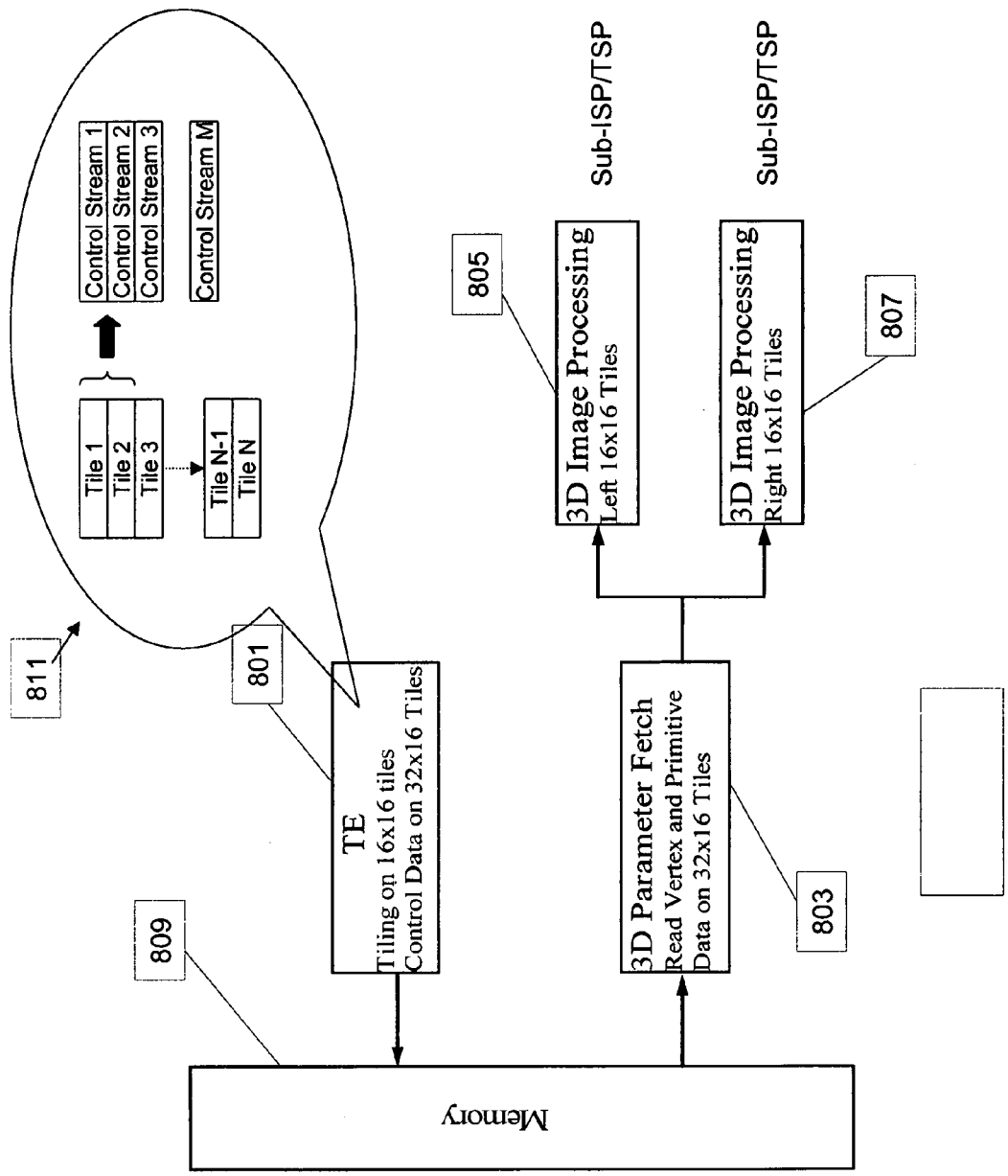
Figure 8A:
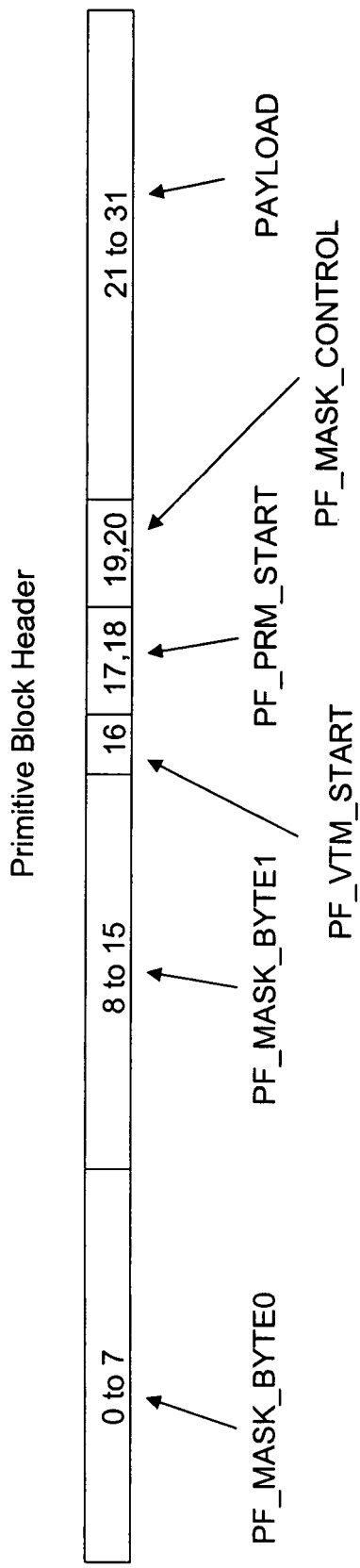
Figure 8B:
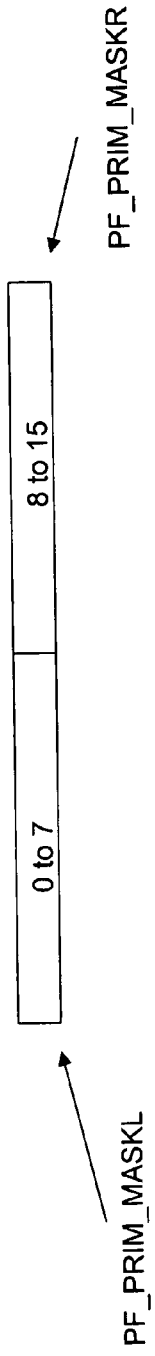
Figure 8C:
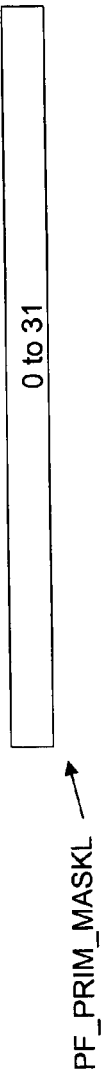
Figure 8D:
Figure 8E:
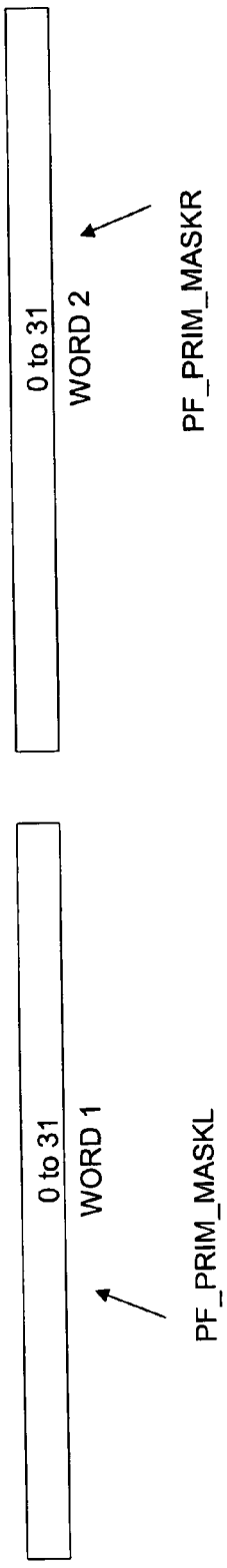
Figure 9:
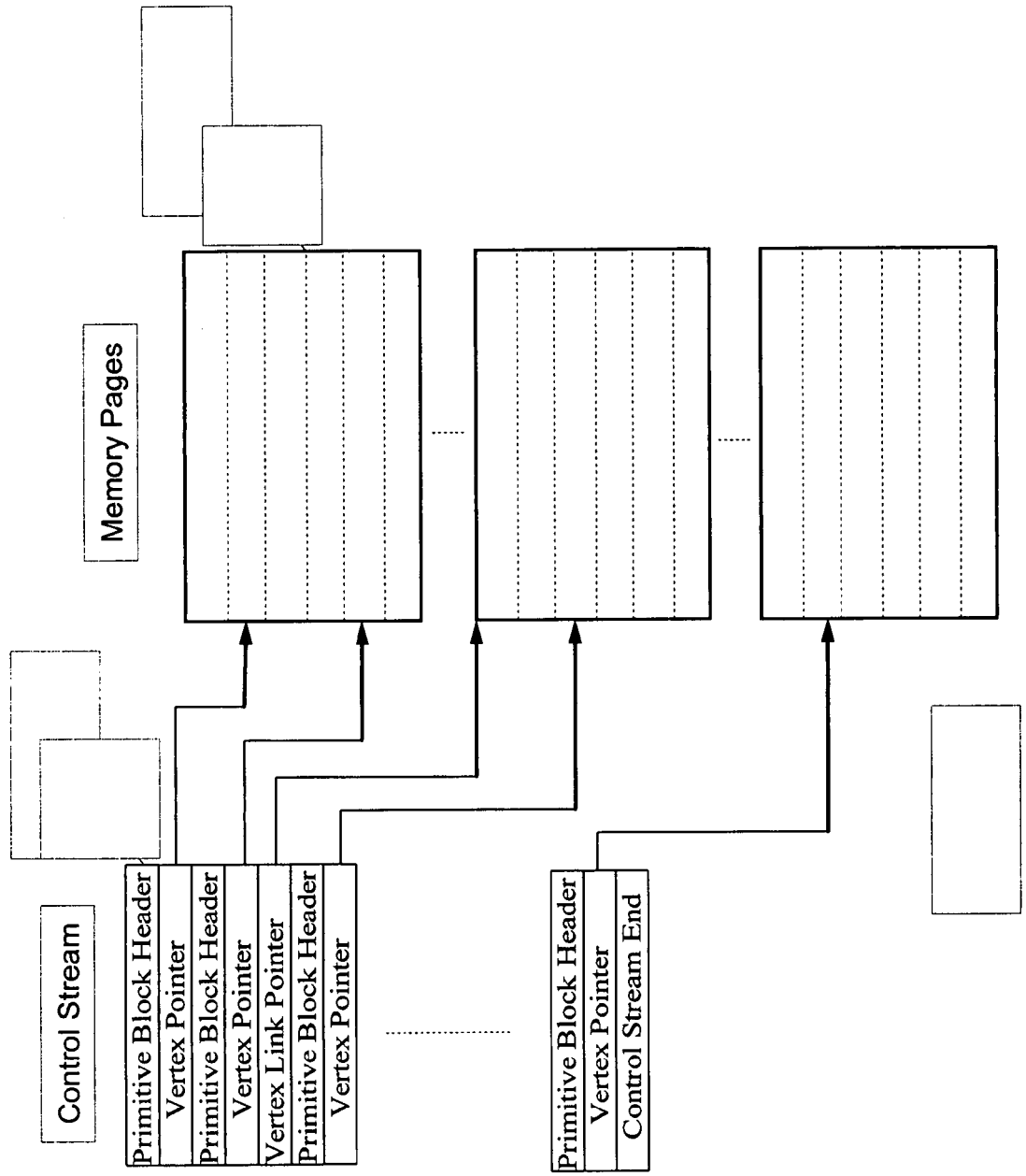
Figure 10:
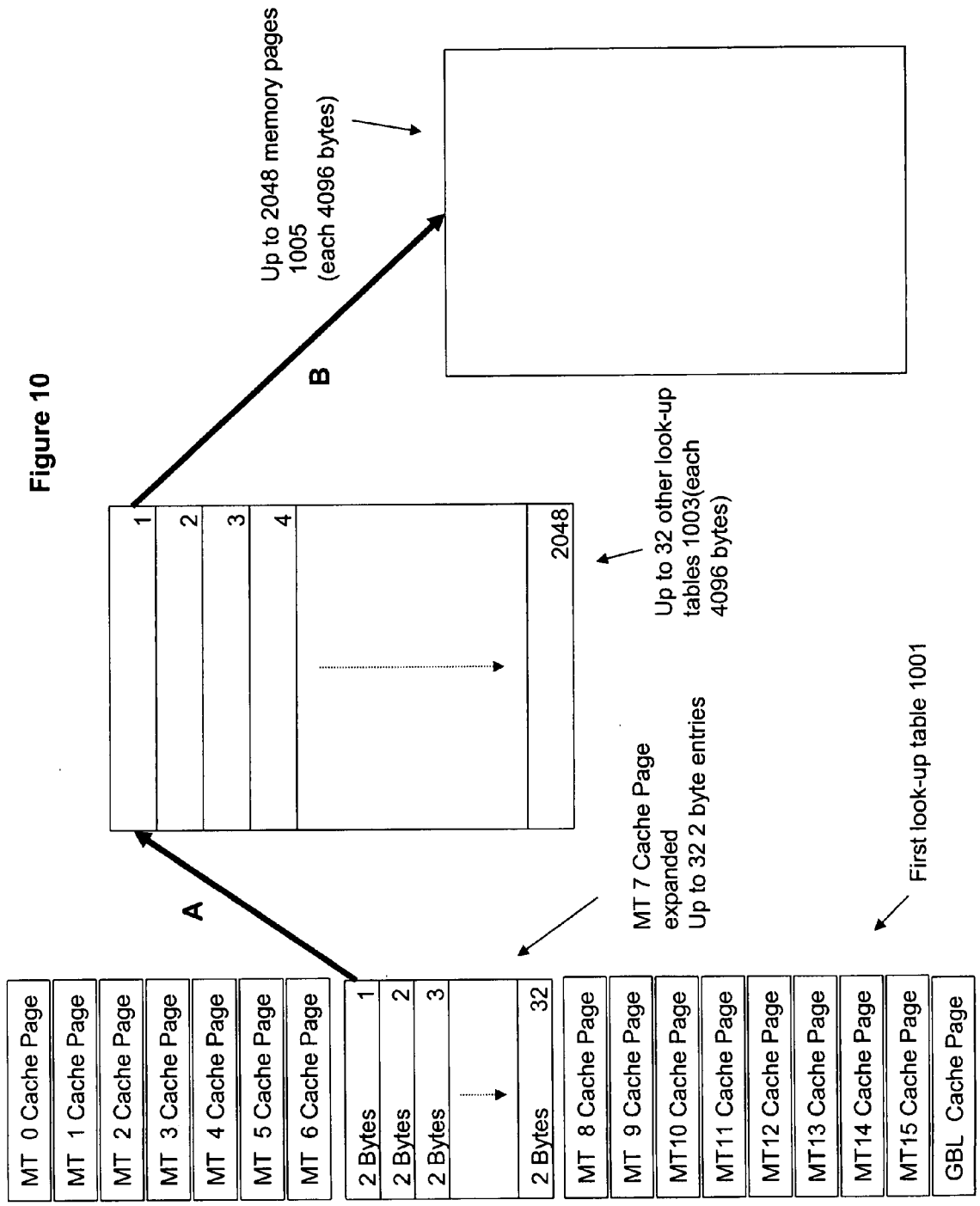
Figure 11:
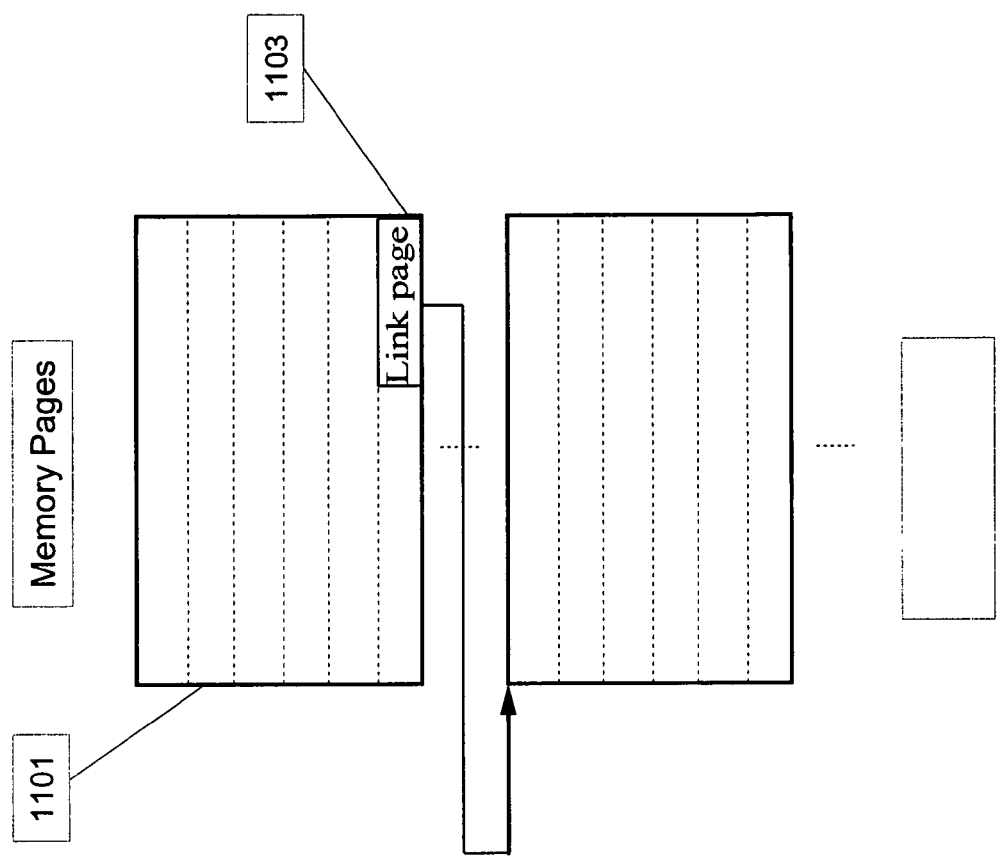

Exemplary embodiments of the invention will now be described with reference to FIGS. 7 to 11, of which:

FIG. 7 is a flow chart of the method of an embodiment of the first aspect of the invention;

FIG. 8 shows an overview of the data structure for tiling with two half tiles according to an embodiment of the second aspect of the invention;

FIG. 8a shows the primitive object header structure in an embodiment of the second aspect of the invention;

FIG. 8b shows the primitive word mask structure when there are two 16-bit primitive half masks, in an embodiment of the second aspect of the invention;

FIG. 8c shows the primitive word mask structure when there is one 32-bit primitive mask, in an embodiment of the second aspect of the invention;

FIG. 8d shows another primitive word mask structure when there is one 32-bit primitive mask, in an embodiment of the second aspect of the invention;

FIG. 8e shows the primitive word mask structures when there are two 32-bit primitive masks, in an embodiment of the second aspect of the invention;

FIG. 9 is a schematic diagram of an embodiment of the third aspect of the invention, showing two vertex pointers allocated to a primitive object;

FIG. 10 is a schematic diagram of an alternative embodiment of the third aspect of the invention, showing use of a look-up table to make the memory page allocation contiguous; and FIG. 11 is a schematic diagram of the page link in a compressed z buffer according to an embodiment of the fourth aspect of the invention.

DETAILED DESCRIPTION OF PREFERRED EMBODIMENTS

As discussed above, according to a first aspect of the invention, there is provided a way in which memory usage can be improved by the method of deriving the control stream data. An embodiment of the first aspect will now be described.

Figure 5:
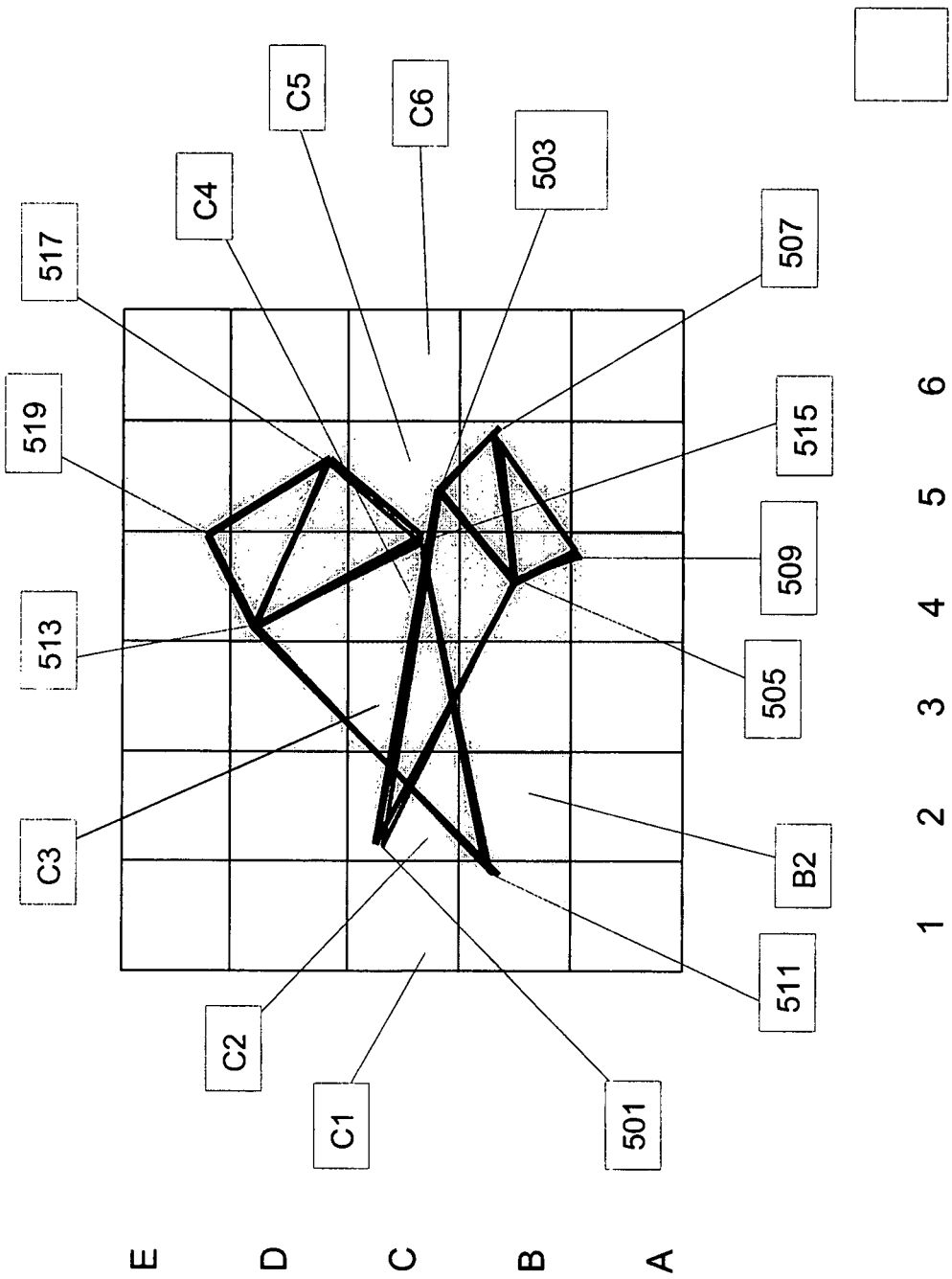
FIG. 5 is a schematic view of a scene showing tiles, primitives and primitive objects.
Figure 6:
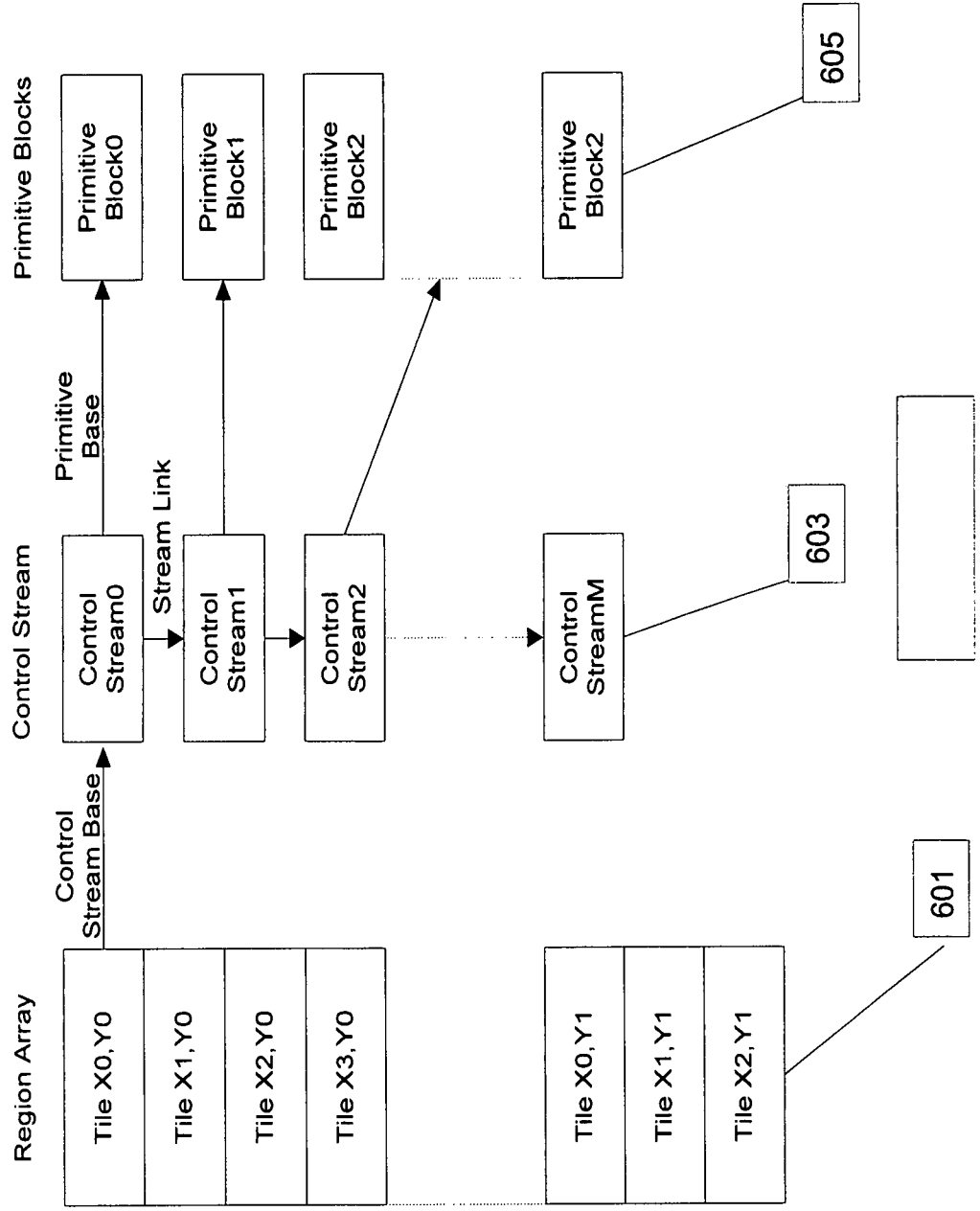
FIG. 6 shows an overview of the data structure for tiling.

As discussed above with reference to FIGS. 4, 5 and 6, in the standard arrangements, the TE 405 takes primitive objects (each comprising a number of primitives) from MTE 403 and computes the minimum number of tiles needed to render that primitive object. For example, the tiles needed to render the first primitive object in FIG. 5 are C2, C3, C4, C5, B3, B4, B5 and A4. That minimal list of tiles is then processed and a vertex pointer for the address of the primitive object, along with a primitive object header describing the primitives present in the tile are written to dynamically allocated memory, as control stream. This is shown in FIG. 6.

Each tile has its own memory block used for the control stream data and the memory blocks are allocated on demand by the DPM 411. When new data to be added to the control stream for a particular tile will exceed the current memory block allocated by the DPM 411, a new allocation is requested and the old control stream is linked to the new allocation using a stream link. If the MTE 403 indicates the end of a scene via a terminate signal, all the tiles are processed and control systems for tiles in the valid region are ended with a terminate word.

Although a global list may be used when a primitive object covers more than one macro-tile, for primitive objects containing big primitives, the control stream data may need to be written a number of times for all the tiles in which the primitives fall. In the extreme case, the control stream data may have to be written for every tile on the screen. Such repetitions of the control stream data do not produce efficient memory usage.

It is known from GB 060619327.0 that memory access can be improved using a small cache added to the TE—the Tail Pointer Cache (TPC). The memory location at the end of control stream in a tile is stored and read from the Tail Pointer Cache, when the memory next needs to be accessed. This reduces main memory accesses from the TE. Although the provision of a TPC reduces the number of main memory accesses required, it does not improve the frequent address changes between control streams from one tile to the next. Because the writes of control streams are scattered, it is not very efficient for a memory interface with a wide bus. For example, if a memory interface is 128 bits wide, to write two 32 bit words of control data in each tile will cause most of the memory writes to be not full burst (32 bits×2 is considerably less than 128 bits). In that case, part of the burst write has to be masked out (i.e. the unused 64 bits) in order to only update the valid 64 bits in the 128 bits burst write. There may be performance penalties of this kind of masked burst write on the memory module.

In this embodiment of the invention, the TE takes two primitive objects (rather than one) at a time from the MTE. The TE processes the two primitive objects at the same time for a particular tile. So, rather than taking each primitive object, and working through the tiles that the primitive object falls in, then taking another primitive object and so on, the TE takes two primitive objects at a time, which improves memory usage and access.

Referring to FIG. 5, the TE takes both primitive objects from the MTE. The TE writes control stream data for each tile in which one or both of the primitive objects fall (in this case, the shaded tiles) in turn. For tiles in which only one primitive object falls (e.g. tile B5), the TE writes control stream data for that primitive object. At the end of the control stream, the memory location is stored in the Tail Pointer Cache (TPC). For tiles in which both primitive objects fall (e.g. tile C3), the TE generates control stream data for the first primitive object. Then, it generates control stream data for the second primitive object. The control stream data in the tile for both the primitive objects is written to the memory together. The end memory address of the control stream is stored in the TPC at the end of all the processing for the entire processing of the tile, before the processing continues for another tile.

The general method of the embodiment is shown in the flow chart of FIG. 7. Tiling is done on two primitive objects, and each primitive object can contain up to 32 shapes (also referred to as primitives).

Thus, for those tiles in which two primitive objects fall, the address at the end of the control stream for that tile needs to be read only once, rather than twice in the previous system. For those tiles, the control stream data write becomes a full 128 bits burst write rather than two masked writes of less than 128 bits. The TPC access is halved for those tiles. The inventors of the present invention have found that the percentage of full 128 bits burst writes for control stream data can be increased from 0% to 25% in some cases and the percentage of TPC cache misses can be reduced from 12% to 0.04% in some cases.

The embodiment above has been described for the TE taking two primitive objects at a time from the MTE. Obviously, the method could be extended so that the TE takes more than two objects at a time from the MTE. The number of primitive objects taken each time will depend on the complexity of the scene to be rendered, the complexity of the primitive objects themselves (i.e. how many surfaces and vertices they comprise) and the processing power of the TE.

As discussed above, according to a second aspect of the invention, there is provided a way to improve the performance of the 3D image generator by allowing two identical 3D image processing pipes to work on two tiles at the same time. This is shown in FIG. 8.

Figure 4:
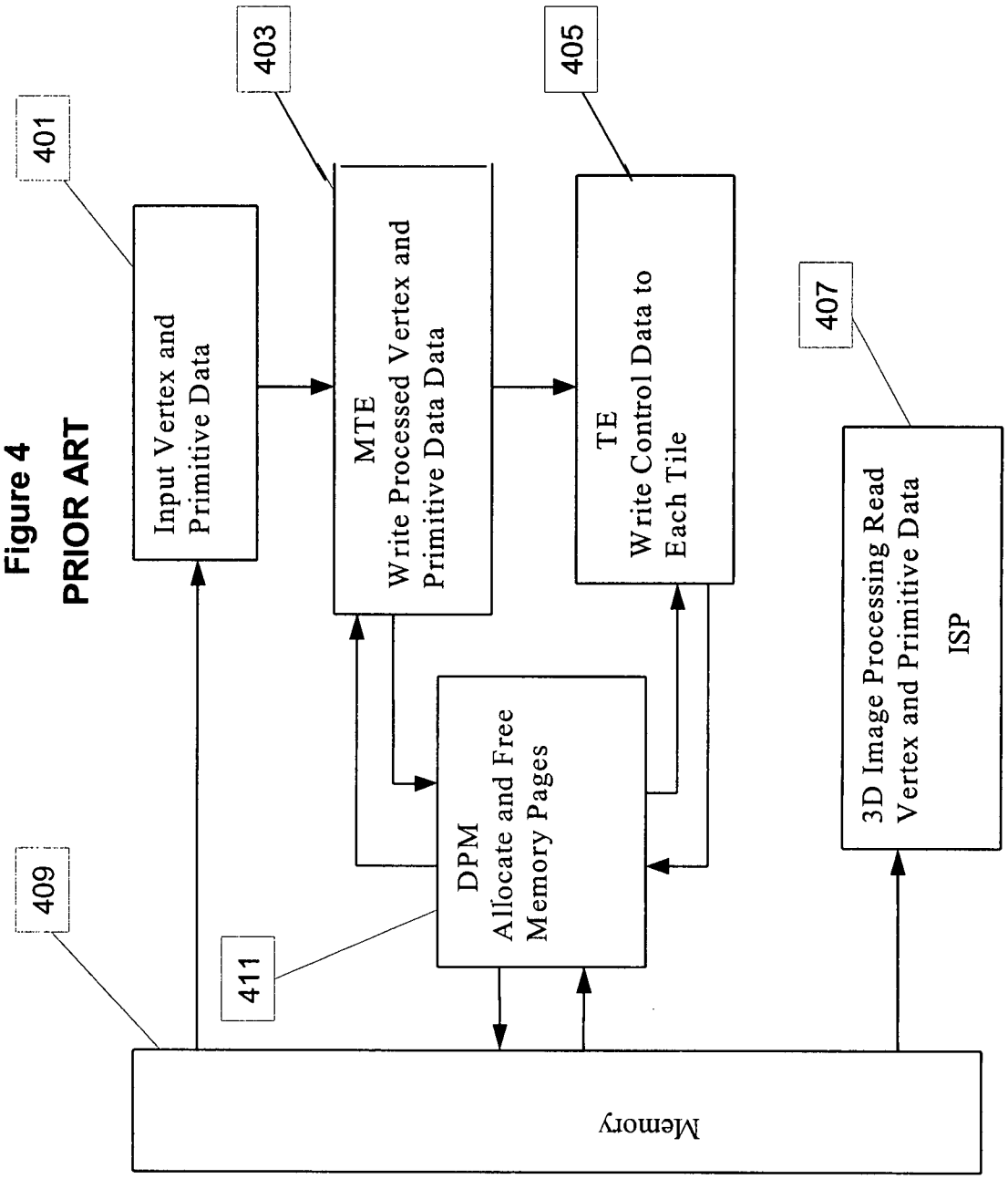
FIG. 4 is a more detailed view of the rendering and texturing system of FIG. 3.

FIG. 8 is a simplified version of FIG. 4, showing only the TE, the ISP and the memory. The TE 801 writes control data to the memory 809. The 3D parameter fetch 803 reads the vertex and primitive data and performs the image processing. In this embodiment, this is performed in parallel by two sub-ISP/TSPs 805 and 807. With this arrangement, the performance of the 3D image processing is expected to be doubled.

To make the system of FIG. 8 operate effectively, the TE 801 writes control data for two of the tiles together. This is shown schematically at 811. The method greatly reduces overlap on the tiling control stream data, so gives a good memory bandwidth improvement.

If each tile size is 16×16 pixels, the TE 801 tiles all the primitive objects in the original 16×16 tiles. But, the TE writes the control stream data (as shown at 811) in 32×16 pixel tiles i.e. two adjacent 16×16 tiles. That is, two 16×16 tiles are referenced in each control stream. The advantage of this is that the total amount of control stream data written will be reduced significantly because objects which fall in both tiles only have to be written to once. On the other hand, there is a disadvantage. The control stream data are based on the assumption that the bounding box of a primitive object overlaps with both the 16×16 tiles. There may be, say, up to 32 primitives and 16 vertices in a primitive object, but not all of those primitives and vertices will fall within a particular 16×16 tile. When some of the primitives and vertices fall in only one of the two 16×16 tiles, it will be a waste to fetch and process the parameter data reference by those invalid primitives and vertices. Putting this another way, by taking two tiles at a time, the advantage of having the smaller tiles in the first place is somewhat reduced.

In the present embodiment, the problem is solved by using vertex masks and primitive masks in the control stream. The control stream data includes, for each primitive object, a primitive object header and a vertex pointer, which points to the memory addresses of the object data (comprising primitive and vertex data) for the primitive object. The masks used in this embodiment, indicate the valid vertices and primitives for each 16×16 tile i.e. the vertices and primitives actually falling within that tile. The vertex mask is a 16 bit mask that can be included in the primitive object header, along with other information like the vertex count and the primitive count. The vertex mask defines the valid vertices for each 32×16 tile. Usually two 32 bit primitive masks are needed, one for each of the 16×16 tiles. The primitive mask defines the valid primitives for each 16×16 tile. The primitive mask(s) may be included in the header, or may need to be added as extra words in the control stream. Note that only one vertex mask is required for both 16×16 tiles, whereas one primitive mask is required for each 16×16 tile, in this embodiment. This is because the vertex data are read in bursts and the rendering process is based on primitives, so it does not cost much to read a few unnecessary vertices. Thus, a single vertex mask can be used for the 32×16 tile to save space. On the other hand, it costs much more to process an unnecessary primitive so, to avoid this, a primitive mask is used for each 16×16 tile, even though this requires more space.

To avoid a big impact on memory bandwidth when primitives overlap many tiles, the data size of the masks in the control stream has to be kept to a minimum. The present embodiment uses an encoding scheme to reduce the size of the control stream when the vertex and primitive masks are included.

As already discussed, the vertex mask (and possibly the primitive mask) is included in the primitive object header. Details of the encoding scheme for the 32 bit primitive object header is shown in Table 1:

TABLE 1

| Bit | Symbol | Description |
| --- | --- | --- |
| 31:21 | ... | ... |
| 20:19 | PF_MASK_CONTROL | A 2 bit field which determines how the vertex mask and primitive mask have been packed. The field has the following encodings:<br>01 - PF_MASK_CTRL_PRIM_MASK_PRES: extra 1 or 2 32-bit words of primitive mask are present in the control stream, where the number of 32 bits words depends on PF_PRM_START.<br>00 - PF_MASK_CTRL_PACKED_LEFT: primitive mask and vertex mask packed into header word and primitive mask pertains to the left 16 × 16 of the 32 × 16 tile.<br>11 - PF_MASK_CTRL_PACKED_RIGHT: primitive mask and vertex mask packed into header word and primitive mask pertains to the right 16 × 16 of the 32 × 16 tile.<br>10 - PF_MASK_CTRL_FULL_MASK: all primitives in the primitive object are referenced on both halves of the tile. |
| 18:17 | PF_PRM_START | If PF_MASK_CONTROL not equals PF_MASK_CTRL_PRIM_MASK_PRES: this indicates the byte offset of PF_MASK_BYTE0 within the primitive mask.<br>If PF_MASK_CONTROL equals PF_MASK_CTRL_PRIM_MASK_PRES:<br>00 - Followed by 2 16-bit Primitive Half Masks (0xRL)<br>01 - Followed by 1 32-bit primitive mask (0xL)<br>10 - Followed by 1 32-bit primitive mask (0xR)<br>11 - Followed by 2 32-bit primitive masks (0xL, 0xR) |
| 16 | PF_VTM_START | If PF_MASK_CONTROL not equals PF_MASK_CTRL_PRIM_MASK_PRES:<br>If 1, indicates that PF_MASK_BYTE1 contains the top 8 bits of the vertex mask.<br>If 0, indicates that PF_MASK_BYTE1 contains the lower 8 bits of the vertex mask.<br>If PF_MASK_CONTROL equals PF_MASK_CTRL_PRIM_MASK_PRES and PF_PRM_START is 00:<br>If 1, it indicates both of the primitive mask words apply to primitives 31:16, otherwise 15:0 |
| 15:8 | PF_MASK_BYTE1 | Either the top or bottom 8 bits of the vertex mask depending on PF_VTM_START and if PF_MASK_CONTROL equals PF_MASK_CTRL_PRIM_MASK_PRES. |
| 7:0 | PF_MASK_BYTE0 | Either the lower 8 bits of the vertex mask or a byte of primitive mask depending on PF_PRM_START and if PF_MASK_CONTROL equals PF_MASK_CTRL_PRIM_MASK_PRES. |

The structure of the primitive object header, as shown in Table 1, is illustrated in FIG. 8a.

PF_MASK_CONTROL: There are two bits (20:19) used for the primitive mask control flag: "PF_MASK_CONTROL". This determines where in the control stream the vertex mask and primitive mask are included. In this encoding, the extra primitive mask word in the control stream is optional.

If the PF_MASK_CONTROL=01= PF_MASK_CTRL_PRIM_MASK_PRES, this means that the primitive mask word is included in the control stream. On the other hand, if the PF_MASK_CONTROL≠01, then the primitive word is not included in the control stream and is included in the header.

In the former case PF_MASK_CONTROL=01, there may be either one or two extra primitive mask words needed. Whether there are one or two 32 bit words is indicated at PF_PRM_START. The conditions to have only one extra primitive mask word are that both primitive masks only have either the lower 16 bit or the higher 16 bit set. This means that both the primitive objects are only valid in either the left hand 16×16 tile or the right hand 16×16 tile, but not both. In that case, if there were two primitive mask words, one would simply be zeros, so that primitive word mask can be cut out entirely. Or, the primitives in both the primitive objects are only valid in one of the 16×16 tiles, either left or right. Otherwise, two extra primitive mask words are needed and these are added in the control stream for the primitives referenced in the two 16×16 tiles.

The conditions to have the latter case PF_MASK_CONTROL≠01 i.e. no primitive word included in the control stream, are that all primitives in the primitive object are referenced in the current 32×16 tile (i.e. that all primitives in the primitive object fall in both 16×16 tiles, so there is no need for a primitive mask word), or that there is only a single byte of non-0 bits for both the primitive and vertex masks. The second condition means that the vertex mask word has one byte of non-0 bits and the non-0 vertex mask byte is in PF_MASK_BYTE1. That is, either vertex 1 to 8 are not referenced in the 32×16 tile or vertex 9 to 16 are not referenced in the 32×16 tile. (As will be discussed later, if PF_VTM_START is 1, this indicates that PF_MASK_BYTE1 contains the top 8 bits of the vertex mask, that is vertex 1 to 8 are not referenced in the 32×16 tile. If PF_VTM_START is 0, this indicates that PF_MASK_BYTE1 contains the lower 8 bits of the vertex mask, that is vertex 9 to 16 are not referenced in the 32×16 tile.) In the latter case there is only one byte primitive mask in PF_MASK_BYTE0, so one of the 32 bits primitive masks must be 0. That is the primitives are only valid in one of the 16×16 tiles, either left or right. The value in PF_PRM_START indicates the byte offset of PF_MASK_BYTE0 within the primitive mask. For example if PF_PRM_START=1 then the 32 bits primitive mask would looks like 0x0000F700, byte 1 0xF7 is inserted as PF_MASK_BYTE0 in the header.

In the latter case, PF_MASK_CONTROL≠01, there There are two possibilities for the packed one byte primitive mask in PF_MASK_BYTE0 when PF_MASK_CONTROL≠01.

If the PF_MASK_CONTROL=00 (PF_MASK_CTRL_PACKED_LEFT), the primitive mask and the vertex mask are both included in the header, and the packed one byte primitive mask in PF_MASK_BYTE0 pertains to the left half of the 32×16 tile.

If the PF_MASK_CONTROL=11 (PF_MASK_CTRL_PACKED_RIGHT), the primitive mask and the vertex mask are both included in the header, and the primitive mask pertains to the right half of the 32×16 tile.

Thus, if these two bits of PF_MASK_CONTROL_are 00, 11 or 10, there is no extra primitive mask in the control stream.

PF_PRM_START: There are two bits (18:17) used for the primitive mask start: "PF_PRM_START". The PF_PRM_START is used differently depending on whether the primitive masks are included in the header (PF_MASK_CONTROL≠01) or included as additional masks in the control stream (PF_MASK_CONTROL=01).

If PF_MASK_CONTROL≠01, the two bits indicate the byte offset of PF_MASK_BYTE0 within the primitive mask when the primitive mask is included in the header.

If PF_MASK_CONTROL=01, the two bits are used to indicate what extra masks are included in the control stream, as follows.

If the two bits i.e. PF_PRM_START are 00, there are two 16-bit primitive masks included in the control stream, that is both of the 32 bits primitive masks for the left and right 16×16 tiles have either the lower 16 bits as 0 s, or the higher 16 bits as 0 s. If PF_VTM_START=0, it indicates the two 16 bits primitive masks are for the bits 0 to 15, that is in both 16×16 tiles only primitive 1 to 16 are referenced. If PF_VTM_START=1 it indicates the two 16 bits primitive masks are for the bits 16 to 31, that is in both 16×16 tiles only primitive 17 to 32 are referenced.

These two 16 bits primitive masks are combined into a 32 bits primitive mask word. This is shown in Table 2 below:

TABLE 2

| | PF_PRIM_START = 00 | |
|---|---|---|
| Bit | Symbol | Description |
| 31:16 | PF_PRIM_MASKR | Either the upper or lower 16 bits of the mask for the right hand half of the tile, depending on PF_VTM_START |
| 15:0 | PF_PRIM_MASKL | Either the upper or lower 16 bits of the mask for the left hand half of the tile, depending on PF_VTM_START |

The structure of the primitive mask word in this case is shown in FIG. 8b. Bits 0 to 15 are used for the 16-bit primitive half mask for the left hand 16×16 tile. Bits 16 to 31 are used for the 16-bit primitive half mask for the right hand 16×16 tile.

If the two bits i.e. PF_PRM_START are 01, there is one 32-bit primitive mask for the left-hand 16×16 tile, included in the control stream. This is shown in Table 3 below:

TABLE 3

| | PF_PRIM_START = 01 | |
|---|---|---|
| Bit | Symbol | Description |
| 31:0 | PF_PRIM_MASKL | A 32 bit primitive mask covering the left hand tile. |

The structure of the primitive mask word in this case is shown in FIG. 8c.

If the two bits i.e. PF_PRM_START are 10, there is one 32-bit primitive mask, for the right-hand 16×16 tile, included in the control stream. This is shown in Table 4 below:

TABLE 4

| | PF_PRIM_START = 10 | |
|---|---|---|
| Bit | Symbol | Description |
| 31:0 | PF_PRIM_MASKR | A 32 bit primitive mask covering the right hand tile. |

The structure of the primitive mask word in this case is shown in FIG. 8d.

Finally, if the two bits i.e. PF_PRM_START are 11, there are two 32-bit primitive masks, one for each 16×16 tile, included in the control stream. This is shown in Tables 5a and 5b below:

TABLE 5a

| | PF_PRIM_START = 11, Word 1 | |
|---|---|---|
| Bit | Symbol | Description |
| 31:0 | PF_PRIM_MASKL | 32 bit primitive mask where each bit maps to one triangle in the primitive object. The primitive mask identifies which triangles in each primitive object the current tile references. (Left hand half of the tile) |

TABLE 5b

| | PF_PRIM_START = 11, Word 2 | |
|---|---|---|
| Bit | Symbol | Description |
| 31:0 | PF_PRIM_MASKL | 32 bit primitive mask where each bit maps to one shape in the primitive object. The primitive mask identifies which shapes in each primitive object the current tile references. (Right hand half of the tile) |

The structure of the primitive mask word in this case is shown in FIG. 8e.

PF_VTM_START: Referring to Table 1, once again, there is one bit (16) used for the vertex mask start "PF_VTM_START". The PF_VTM_START is used differently depending on whether the primitive masks are included in the header (PF_MASK_CONTROL≠01) or included as additional masks in the control stream (PF_MASK_CONTROL=01).

If PF_MASK_CONTROL≠01, i.e. the primitive masks are included in the header, if this bit is set i.e. =1, this indicates that PF_MASK_BYTE1 (to be discussed below) reflects the byte 1, top 8 bits of the 16 bits vertex mask. If this bit is cleared i.e. =0, this indicates that PF_MASK_BYTE1 contains the byte 0, lower 8 bits of the 16 bits vertex mask.

If PF_MASK_CONTROL=01, i.e. the primitive masks are added into the control stream, and if PF_PRM_START=00 (i.e. the control stream includes two 16-bit Primitive Half Masks), if PF_VTM_START is 1, it indicates that both of the 16-bit primitive half masks apply to primitives 31:16. Otherwise, they apply to 15:0.

PF_MASK_BYTE1:

There are eight bits used for "PF_MASK_BYTE1". PF_MASK_BYTE1 depends on the status of PF_MASK_CONTROL and PF_VTM_START. If PF_MASK_CONTROL=01 i.e. the primitive masks are included in the header in PF_MASK_BYTE0, and PF_VTM_START equals 1, these eight bits are the top 8 bits of the 16 bits vertex mask. On the other hand, if PF_MASK_CONTROL≠01 and PF_VTM_START equals 0, these eight bits are the bottom 8 bits of the 16 bits vertex mask.

PF_MASK_BYTE0:

There are eight bits used for "PF_MASK_BYTE0". PF_MASK_BYTE0 depends on the status of PF_MASK_CONTROL and PF_PRM_START. If PF_MASK_CONTROL=01 i.e. the primitive masks are included in the control stream not the header, then the 16 bits vertex mask is in PF_MASK_BYTE0 and PF_MASK_BYTE1 with PF_MASK_BYTE0 as the lower 8 bits of the vertex mask. On the other hand, if PF_MASK_CONTROL≠01 the one non-0 byte from primitive mask is in PF_MASK_BYTE0. In this case the byte offset of this non 0 byte primitive mask is from PF_PRM_START.

When the TE processes the primitive and vertex data from a primitive object in a 32×16 tile, it examines all the vertices in the object to make a vertex mask for the valid vertices in the tile. Afterwards the TE generates two primitive masks for the valid primitives in the object falling in each of the 16×16 tiles. The encoding scheme described above is then used to write the vertex mask and primitive mask(s) into the control stream data with as small a size as possible.

The tail pointer address of the end of the control stream is read back through the Tail Pointer Cache (TPC) at the start of the tiling for the 32×16 tile. The tail pointer address is only written back after all the processing of the tile has been completed. In the case where both 16×16 tiles of a 32×16 tile include both primitive objects (refer back to FIG. 5 and see e.g. tiles C3 and C4), then the two primitive objects will be processed in the two 16×16 tiles and have the appropriate control data written to the control stream before the TPC is updated with the tail pointer to the end of control stream. This improves memory access from control stream data writes, and improves the performance of TPC.

In this embodiment of the invention, the control stream of each 32×16 tile is processed at a time. In a 32×16 tile, the vertices referenced in the tile are fetched from the memory using the vertex mask. This is performed by parameter fetch 803 in FIG. 8. Therefore, there is no memory bandwidth added for fetch vertices which are not referenced in the tile, so the problem discussed above is solved. Similarly, the primitive masks for each of the 16×16 tiles are used to fetch the primitive data. This is also performed by 803 in FIG. 8. Again, there is no memory bandwidth added for fetch primitives which are not referenced in the tile. Then the appropriate primitives and vertices for the left hand 16×16 tile are sent to sub-ISP/TSP 805 and the appropriate primitives and vertices for the right hand 16×16 tile are sent to sub-ISP/TSP 807.

The inventors have found that the method of this embodiment tiling on 32×16 pixel tiles, produces an average 35% reduction of control stream data writes compared to tiling on 16×16 pixel tiles, even with the use of extra primitive mask words. The same level of reduction is also achieved on the total data read at the 3-D parameter fetch.

As discussed above, according to a third aspect of the invention, there is provided a more efficient way to use memory space. An embodiment of the third aspect will now be described.

As already discussed, in existing systems, the memory pages used in macro tiles for vertex and primitive data are allocated on demand, and are therefore not necessarily contiguous pages. To prevent the data from a particular primitive object crossing a page boundary, a new page, from the free store, has to be allocated if there is insufficient space on the current page for the whole primitive object.

There is a limit on the maximum number of vertices and primitives contained in a particular primitive object (e.g. 16 vertices and 32 primitives). As already mentioned, the MTE has to ensure that a primitive object does not span a page boundary of the memory. This is because the memory pages are not guaranteed to be allocated in contiguous order. This is difficult, since the front end of the pipeline, which assigns the vertices to the primitive object has no knowledge of the amount of space left for that primitive object. On the other hand, the back end of the pipeline, which allocates the memory and actually puts the primitive object data into the memory, has no control over the number of vertices in the object. The allocation of a new memory page at the back end is performed, if the check to see if there is enough memory space in the current memory page to hold the maximum number of vertices in a primitive object, reveals that there is not sufficient space. The size of vertex data is known (as well as the X, Y, Z coordinates, there may be further data on base colour, offset colour, texture coordinates, how many texture coordinates etc.), and the maximum memory space needed for the primitive object can be calculated easily. So, for the example, where the maximum vertex number in a primitive object is 16, the back end always assumes that the number of vertices is 16 and the front end always assumes it can indeed include up to 16 vertices in one primitive object. On the one hand, this is advantageous since the maximum amount of sharing between vertices can be achieved which gives excellent efficiency in terms of memory bandwidth. But, on the other hand, if there is only space remaining for 15 vertices in that memory page, for example, a new page must be started at the back end, even though the number of vertices allocated at the front end could, in fact, be 14. However, the back end has no way of knowing this and has no control over it. This obviously creates memory wastage. The cost of this memory wastage varies with the size of the vertex i.e. the additional data (like base colour, offset colour, texture coordinates etc) associated with a particular vertex.

This arrangement of the third aspect of the invention provides two embodiments for solving this problem. The first embodiment proposed allows two memory pages to be allocated by the MTE for a primitive object. Thus, a particular primitive object can span two memory pages. So, when the primitive objects are written into the memory by the MTE, at the start, the memory manager allocates two pages of the memory to that macro-tile. (If it turns out that only one page is actually needed, the second page is simply used in the next write.) For all primitive objects, the number of vertices and primitives, together with the memory addresses of the primitive objects—vertex pointers—are sent to the TE to be added into the control stream of the tiles in which the primitive objects are visible. When the MTE is continuously writing primitive object data into the memory, it checks whether the memory write is going to span a page boundary. If the write will be contained within one memory page, only the vertex pointer for that page of memory will be passed to the TE. On the other hand, if the write is going to cross a page boundary, so that the primitive object data will be on two memory pages, both the vertex pointers, for the first page and the second page, are sent to the TE.

When the data being sent by the MTE to the TE includes two vertex pointers (because the MTE write has crossed a page boundary as described above), the TE will write an additional vertex pointer for the address of the linked page in the control stream for that tile. This is shown schematically in FIG. 9.

In FIG. 9, the control stream includes, for the first primitive object, a primitive object header, then a vertex pointer for that primitive object. Thus, the object data for that primitive object is stored only on the first memory page. For the second primitive object, however, the control stream includes a primitive object header, a vertex pointer and a vertex link pointer. This vertex link pointer is the vertex pointer for the second memory page and it can be seen that the vertex pointer points to the first memory page whereas the vertex link pointer points to the second memory page. Thus, the object data for that primitive object spans two memory pages—the first memory page and the second memory page.

When the image processing is being performed for that tile, the control stream is parsed, and the ISP sees that there are two vertex pointers for a particular primitive object. These vertex link page pointers are passed down the pipeline. If the memory address crosses a page boundary, the linked page address from the second vertex pointer is used in fetching the primitive and vertex data from memory. Note that, because of the maximum limit of primitive object size and the way the memory pages are allocated, the MTE write will only ever require a maximum of two pages i.e. there are only ever one or two vertex pointers.

The second embodiment proposed provides the Dynamic Parameter Management (DPM) with additional logic to guarantee that the pages are contiguous, and an additional small cache. If the pages are guaranteed to be contiguous, it is acceptable for the write for a given macro tile to span two pages.

In order to keep the pages allocated to each macro tile, when the MTE is writing, contiguous, the DPM maintains a look-up table page or pages, a portion being allocated for each macro tile. The pages allocated to the MTE are contiguous indexes in the look up table rather than contiguous memory page addresses. For each macro tile, there is a portion in the look-up table which provides pointers to the actual memory pages where the data is written. The portions in the look-up table are contiguous; this is achievable since they are allocated by the DPM at the start.

A counter is maintained in the DPM, for each macro tile (and the global list if being used) for page allocation to the MTE. When a first page is allocated to a macro tile for data written by the MTE, a portion is also allocated in the look-up table page for that macro tile. The address of the first page allocated to the macro tile is written to location 0 of the portion in the look up table page for that macro tile. Subsequent allocations for that macro tile will be written to locations 1, 2 etc of the portion in the look-up table page for that macro tile. Thus, even though the actual pages allocated may not be contiguous, the portions in the look up table are contiguous, so data written for a macro tile can span more than one page. Once the look-up table portion is full, a new portion is allocated in the look-up table and that location is filled with further memory page address allocations. All the macro tiles are treated in this way. Once a full screen render has been performed, all the memory pages and look up table pages are freed up.

Thus, the MTE receives two addresses from the DPM: one is the actual address where data is written, the other is the address of the portion of the look-up table page (the base address) for that macro tile. The addresses in the look-up table, which are contiguous addresses for the macro tile, are used as the vertex pointers (i.e. the memory addresses for the object data) passed to the TE, and the actual address where the data is stored, is used for writing data into the memory.

The base address of the look-up table memory page can be held in a register. The 3D image processing module (ISP) reads this base address before processing the primitive objects in each tile. During processing of the primitive objects in each tile, the address of the portion of the look-up table page is fetched from the directory entry of the macro tile it belongs to. The vertex pointers read back from the control stream, are used to obtain the memory addresses where the actual data is written. So, the contiguous look-up table addresses are translated into the non-contiguous memory addresses. In order to make this translation between the contiguous look-up table addresses and the non-contiguous memory addresses more efficient, a cache can be used to access these addresses.

FIG. 10 shows this embodiment schematically. The first look-up table is shown at 1001. We have a base address for the look-up table. This points to the look-up table 1001, which contains up to 32 entries for each macro tile MT0, MT1 . . . , each entry being 2 bytes i.e. a total of 64 bytes. (In FIG. 10, the entries are only shown for MT 7 for simplicity, but this applies to all macro tiles). In this embodiment, there are 16 macro tiles, plus the global list (for storage of object data traversing more than one macro tile), so this gives 17×64 bytes=1088 bytes. Each page of memory in this embodiment is 4096 bytes, so the entries for all the macro tiles plus the global list, easily fit into a page.

Each 32 2 byte portion points to another look-up table 1003, each one being 4096 bytes in size i.e. taking up a page of memory. This is shown at arrow A. Whilst the look-up table portions are allocated at the start, these extra pages are allocated on demand, for more efficient memory usage. Each 4096 byte table 1003 contains 2048 2 byte translations. This means we can translate from virtual domain 1 (look-up tables 1003) to virtual domain 2 (memory pages 1005). Each 2 byte portion references a 4096 byte page 1005. This is shown at arrow B. Thus, we have 2048×4096 bytes=around 8 MB. There are up to 32 of these for each macro tile i.e. 32×8 MB=256 MB. So, each macro tile can hold 256 MB of virtual address space.

Now, in this embodiment, the total amount of memory is 256 MB, so that, even if all the data is in one macro tile, the whole space can be addressed contiguously. The incoming virtual address consists of 16 bits. The macro tile number and the top 5 bits are used to address the first table (called the directory) and indicate which of the 32 other tables to access. The bottom 11 bits indicate which of the 2048 translation values are actually to be used. Thus, the steps for translating between the contiguous addresses and the virtual addresses are 1) select appropriate macro-tile 2) use top 5 bits to select the correct second look-up table, and 3) use 11 bottom bits to select which of the 2048 memory pages is the actual virtual address.

In this embodiment, the contiguous and virtual addresses are provided by the DPM to the TA. The address the data is written to, is the virtual one, and the address embedded in the control stream is the contiguous one. The look-up table is used by the ISP and TSP parameter fetch, to translate the contiguous address into a virtual one. In order to make this second translation efficient, this look-up table is cached which is necessary in order to maintain performance.

The inventors have found that, after applying either of these embodiments, an average of 15% reduction of memory space used by the MTE can be achieved. The difference between the two solutions is that the first solution (using two vertex pointers) gives a smaller implementation because we do not have to add two new caches. However, it requires the parameter format to be changed and increased in complexity. The second solution (using the look-up table) allows a write to span two pages and it can be implemented without affecting the rest of the system. There is also no increased overhead of a second pointer.

In the embodiments of the third aspect of the invention, described above, the problem of memory allocation for object data was addressed. To prevent the data from a particular primitive object crossing a page boundary, a new page, from the free store, had to be allocated if there was insufficient space on the current page for the whole primitive object. A similar problem can arise for the depth data stored in the z buffer memory (see FIG. 2) and this will now be described further.

Figure 1:
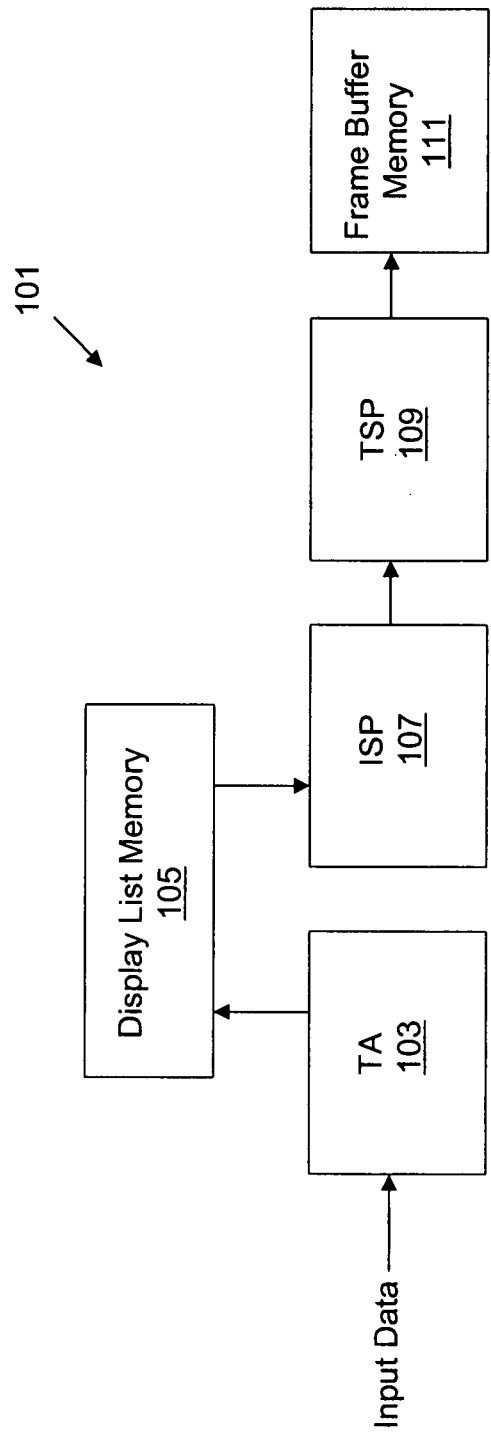
FIG. 1 is a schematic view of a first known rendering and texturing system.
Figure 2:
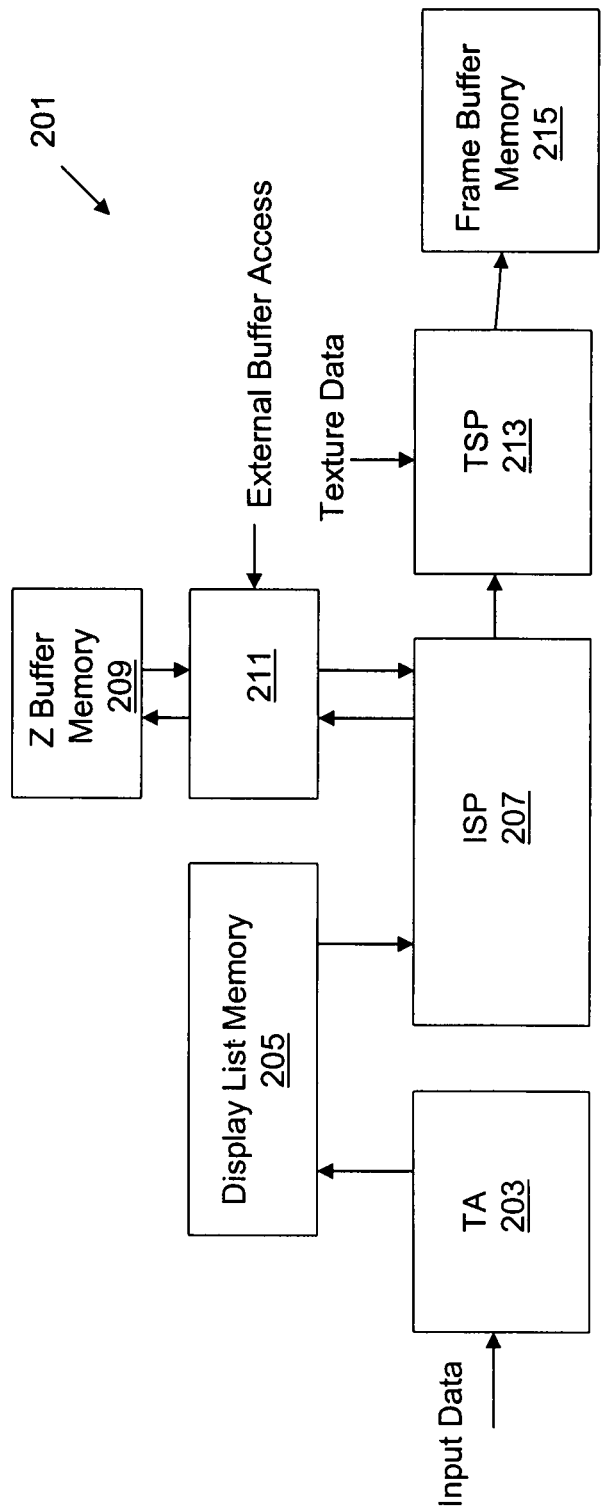
FIG. 2 is a schematic view of a second known rendering and texturing system, which provides an improvement over that of FIG. 1.
Figure 3:
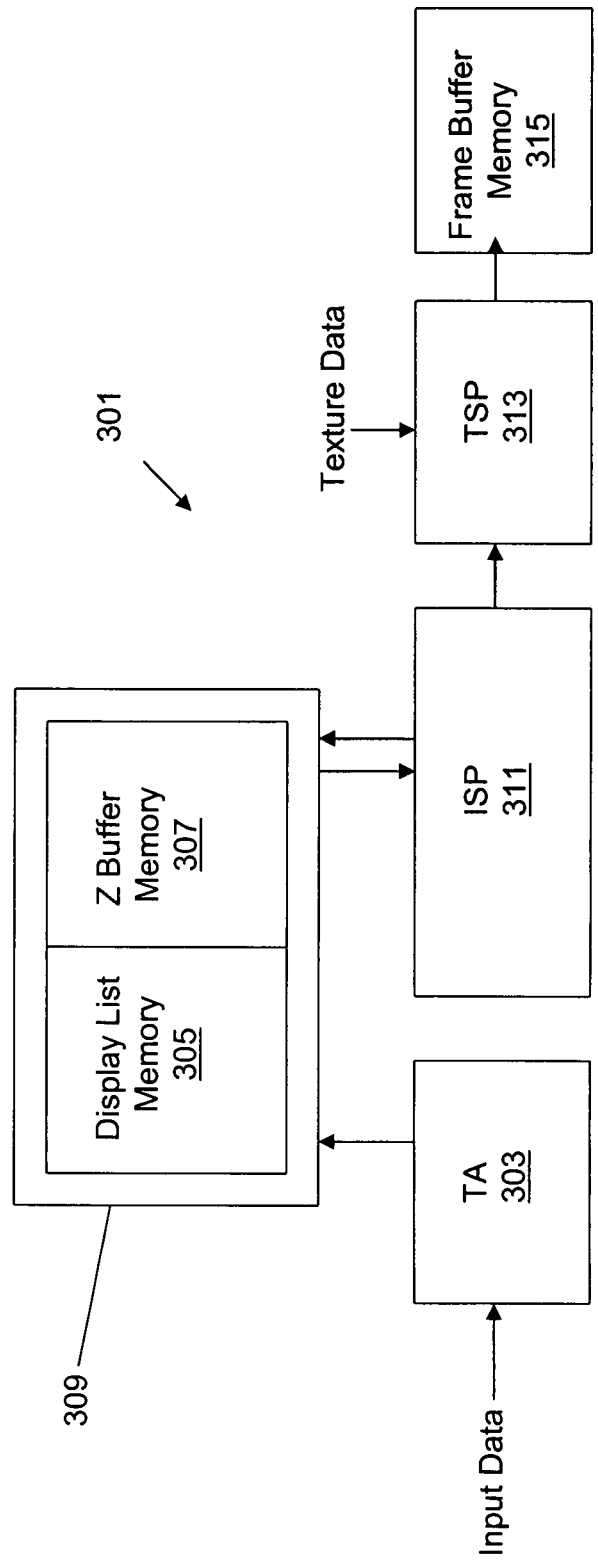
FIG. 3 is a schematic view of a third known rendering and texturing system, which provides an improvement over that of FIG. 2.

FIG. 2 shows an example of a processor used when partial rendering is adopted. Partial rendering is useful for complex scenes, because only some of the object data can be stored, and then a partial render can be performed to free up the display list memory 205. The resultant depth data is stored in the z buffer memory 209 and is combined with future object data to eventually produce the entire image. As shown in FIG. 2, a compression/decompression unit 211 may be used.

To ensure that the image is ultimately produced correctly, the depth data in memory 209 has to be stored on the tiles in the macro tile on which the partial render was performed. Space in the z buffer memory 209 used to store depth data, is allocated on demand by a memory manager (e.g. DPM) and the memory address is saved for the particular tile. Then, more object data is loaded into the display list memory, then a further partial render is performed. At this stage, further depth data is located into the memory address associated with the tile. The final image will be correctly rendered after all the partial renders, and the memory pages of the z buffer memory can be freed up.

When a compression/decompression unit 211 is used, there is no buffer in the unit 211 to hold the compressed depth data for the tile, so the unit writes the data into the memory while compressing and reads the data from the memory while decompressing. To avoid the compressed z data in a tile crossing a memory page, at the start of a tile the compression/decompression unit has to check if there is enough free space in the current memory page. The compression/decompression unit does not know the size of the compressed z data for the tile when it starts to compress the z data and write it into the z buffer memory. Therefore, the maximum size of depth data in a tile has to be assumed, when the compression/decompression unit is checking for free space at the start of the write. Since the size of the depth data is not always the maximum size, there is wasted memory space at the end of a memory page.

This embodiment of the invention attempts to solve this problem by providing a special defined token for the link page address at the end of a page; this is shown in FIG. 11. As shown in FIG. 11, the last 4 byte word 1103 is reserved for the page address link in each memory page 1101 allocated by the DPM to the compressed z data. When the compression/decompression unit detects the that the write is going to cross a memory page, it will request a new page from the DPM. The last word in the current page will be filled with the page address link for the new page, together with a link page header 0x80000000-1103 in FIG. 11. This is a 32 bit hex value with bit 31 as 1, or 4 bytes as 80, 00, 00, 00 from right to left. The compression/decompression unit then continues to write the compressed depth data into the new page as indicated by the page address link for the new page. No memory space is wasted at the end of a page. No page address link is needed if compressed depth data can be contained within the single page (excluding the final 4 bytes). In that case, the last word in the current page will be filled with 0000 . . . .

During the read stage, the compression/decompression unit decompresses the data read from the memory. The last word in a page is always a token for the to a new page address, not the depth data itself. By analysing the header (0x80000000) of the last word in the page, the compression/decompression unit can decide if it is an address for linking to a new page or an empty word (0000 . . . ). The address from the last word is used to continue fetching compressed data from the linked page if the link page header is set.

The advantage of this embodiment is that it does not need the additional address of the new page to be included in the region header of the tile. The page link happens naturally in the compression and decompression process. The implementation is simple and straight forward.

The inventors have found that, after applying this embodiment, an average 35% reduction of memory space used by the compressed z buffer can be achieved.

Several embodiments have been described but the skilled person will appreciate that many other embodiments may be envisaged. The invention is defined by the scope of the following claims.

We claim:

1. A method for generating an image from object data, comprising a plurality of objects, each object comprising at least one shape, the method comprising:
   a) for at least some of the plurality of objects, storing object data in a memory, the object data comprising surface data and vertex data for each shape in the object, and pointers between the surface data and the vertex data;
   b) for each smaller area, of a plurality of smaller areas, each smaller area contained within one of a plurality of rectangular areas in the image to be generated, deriving control data to link to the object data for each object in the smaller area, the control data listing the objects in the smaller area and comprising, for each object in the smaller area, a link to the respective object data by:
      i) extracting object data for two or more objects at a time from the object data stored in the memory
      ii) computing, for the two or more objects at a time, which of the smaller areas in the image include one or more of the objects for which the object data for the two or more objects has been extracted at i),
      iii) for each of the computed smaller areas at ii), deriving, for the two or more objects at a time, a set of control data linking to the object data for each of the objects included in the smaller area by describing the objects in the smaller area and comprising, for each object in the smaller area, a link to the respective object data, and
      iv) repeating i) to iii) until the control data for all the objects for which object data was stored in the memory has been derived;
   c) deriving depth data for each rectangular area from the control data and the object data; and
   d) deriving image data and shading data from the depth data, for display.

2. The method according to claim 1, at a final memory location for each set of the control data derived at iii), a pointer to the next set of the control data for the smaller area and the final memory location storing in a cache.

3. The method according to claim 1, wherein a) comprises storing the object data in the memory for every object in the image.

4. The method according to claim 1, wherein a) comprises storing object data in the memory for a predetermined number of objects in the image, and the method further comprises, before the deriving image data repeating a), b), and c) until the object data has been stored for all the plurality of.

5. The method according to claim 1, wherein i) comprises extracting object data for two objects from the object data stored at a) b).

6. An apparatus for generating an image, the image to be generated from data describing a plurality of objects, each object comprising at least one shape, the apparatus comprising:
   a) a macrotiling engine for storing object data in a memory, for at least some of the objects that may be visible in the image, the object data comprising surface data and vertex data for each shape in the object, and pointers between the surface data and the vertex data;
   b) a tiling engine for deriving control data, for each smaller area, of a plurality of smaller areas, in the image, wherein a plurality of rectangular areas contains a respective plurality of the smaller areas, the control data linking to the object data for each object in the smaller area and comprising, for each object in the smaller area, a link to the respective object data, the tiling engine being arranged to:
      i) extract object data for two or more objects at a time from the object data stored in the memory
      ii) compute which of the smaller areas are overlapped by one or more of the objects for which the object data for the two or more objects has been extracted,
      iii) for each of the computed smaller areas, derive a set of control data linking to the object data for each of the objects included in that smaller area by describing the objects found to overlap that the smaller area and linking to the respective object data for each object, and
      iv) repeat i) to iii) until the control data for all the objects at a) has been derived; and
   c) an image synthesis element for producing depth data for each rectangular area from the control data and the object data and for deriving image data for display.

7. A method for generating an image from source geometry data comprising a plurality of objects comprising:
   a) determining a plurality of separate areas of pixels of the image to be generated;
   b) for at least some of the plurality of objects, storing object data in a memory;
   c) for two of the separate areas at a time, deriving control data for the two separate areas, the control data describing which of the objects overlap each of the two separate areas and linking to respective object data for each object, wherein each object includes a plurality of shapes having a plurality of vertices, and the control data derived includes, for each object, an indication of which shapes of the object fall in which of the separate areas and an indication of which vertices of the object fall in which of the separate areas;
   d) generating the image in the two separate areas by, in parallel:
      i) deriving depth data for the first separate area from the control data and the object data, and deriving image data and shading data for the first separate area from the depth data for display, and
      ii) deriving depth data for the second separate area from the control data and the object data, and deriving image data and shading data for the second separate area from the depth data for display; and
   e) repeating the steps c) and d) until pixels of the image have been generated for all the plurality of separate areas.

8. The method according to claim 7, wherein the control data comprises a header portion and a payload portion.

9. The method according to claim 8, wherein the header portion comprises the indication of which vertices of each object fall in which of the separate areas.

10. The method according to claim 8, wherein, if some of the shapes of a given object fall in each of the separate areas, or all of the shapes of the object fall in only one of the separate areas, the payload comprises the indication of which shapes of that object fall in which of the separate areas.

11. An apparatus for generating an image from object data, the apparatus comprising:
a tiling engine for deriving, for two separate areas at a time, control data describing the objects in the two separate areas, and comprising, for each object in the two separate areas, a link to the respective object data stored in a memory; and
an image generator for generating the image in the two separate areas, the image generator comprising a first-image generator in parallel with a second image generator, the first image generator being arranged to derive depth data for the first separate area from the control data and the object data, and derive image data and shading data for the first separate area using the depth data, the second image generator being arranged to derive depth data for the second separate area from the control data and the object data, and derive image data and shading data for the second separate area using the depth data.

12. A machine-implemented method for generating an image from data describing geometry objects, the method comprising:
for each object, for which object data is to be stored, assigning two memory pages, with separate page addresses;
storing, with a first engine, object data for each object, in the memory, beginning at a first memory page of the two memory pages, and if the object data is stored on one memory page, sending, with the first engine, that one memory page address to a second engine and releasing the assignment of the second of the two memory pages and if the object data is stored on two memory pages, sending, with the first engine, both of the addresses for those two memory page addresses to the second engine;
deriving, with the second engine, control data to link to the object data for each object, the deriving comprising deriving control data for each of a plurality of separate areas of the image to be rendered, the respective control data listing the objects in the corresponding separate area and comprising, for each object in the separate area, a link to the respective object data, the control data including the one memory page address, if the object data is stored on one memory page and including the two memory page addresses, if the object data is stored on two memory pages;
deriving depth data for each separate area from the control data and the object data; and
deriving image data and shading data from the depth data, for display.

13. The method according to claim 12 further comprising allocating, with a memory manager, pages of the memory to the objects in the image.

14. The method according to claim 13, wherein the memory manager automatically allocates two pages of the memory to each object.

15. The method according to claim 12, wherein the deriving the depth data comprises determining whether the control data linking to the object data for each object in the separate areas includes one or two memory page addresses.

16. An apparatus for generating an image from data describing a plurality of objects, the apparatus comprising:
a first engine reserving two memory pages in a memory for storing object data a second engine for deriving control data to link to the object data for each object in the separate area, the control data listing the objects in the separate area and comprising, for each object in the separate area, a link to the respective object data;
an image synthesis processor for deriving depth data for each separate area from the control data and the object data; and
for deriving image data and shading data from the depth data, for display,
wherein
the first engine is arranged to begin storing object data for the object in a first page of the memory and continuing until the object data has been stored, and to release the second page of the two memory pages, if the object data for the object can be stored completely in the first page and to send a memory page address for the first memory page to the second engine and, ii) if the object data is stored on both of the two memory pages, then to send memory page addresses for both of those two memory pages to the second engine, and
the second engine is configured to derive the control data to include the one memory page address if the object data stored by the first engine is stored on one memory page, or to include the two memory page addresses if the object data stored by the first engine is stored on both of the two memory pages.

17. The apparatus according to claim 16 further comprising a memory manager for allocating pages of the memory on behalf of the first engine.

18. The apparatus according to claim 16, wherein the memory manager is arranged to automatically allocate the two pages of memory for storing object data for each object.

19. The apparatus according to claim 16, wherein the image synthesis processor is arranged to determine whether the control data linking to the object data for each object in the separate areas includes one or two memory page addresses.

20. A method for generating an image from data describing a plurality of objects, the method comprising:
dividing, logically, a memory into memory pages;
storing a look-up table in the memory;
allocating, with a memory manager, two or more contiguous portions in the look-up table to each separate area of a plurality of separate areas in the image to be rendered, each allocated portion in the look-up table pointing to a memory page allocated for storing object data for that separate area, wherein the allocated memory pages may be non-contiguous in the memory;
for at least some of the objects in the image, storing with a first engine, the object data, for each separate area, at noncontiguous addresses in the memory pages allocated to that separate area;
for each separate area, sending, with the first engine, to a second engine, memory addresses of the two or more allocated portions in the look-up table;
for each separate area in the image, with the second engine deriving control data to link to the object data for each object in the separate area, the control data listing the objects in the separate area and comprising, for each object in the separate area, a link to the respective object data;
for each separate area with the memory addresses sent from the first engine, deriving depth data from the control data and the object data; and
deriving image data using the depth data, for display.

21. An apparatus for generating a 3-dimensional computer image, the image to be generated comprising a plurality of objects, the apparatus comprising:

a memory logically divided into memory pages and comprising a look-up table;

a memory manager for allocating two or more contiguous portions in the look-up table to each separate area, each allocated portion in the look-up table pointing to a memory page available for storing object data for that separate area;

a first engine arranged for storing the object data, for at least some of the objects in the image, for each separate area, at noncontiguous addresses in the memory pages allocated by the memory manager to that separate area; and a second engine arranged for receiving from the first engine, memory addresses for each separate area, of the two or more allocated portions in the look-up table and arranged for deriving with the memory addresses control data to link to the object data for each object in the separate area, the control data listing the objects in the separate area and comprising, for each object in the separate area, a link to the respective object data;

an image synthesis processor deriving depth data from the control data and the object data for each separate area in the image.

\* \* \* \* \*